(12) United States Patent
Yamaguchi et al.

(10) Patent No.: US 9,106,882 B2
(45) Date of Patent: Aug. 11, 2015

(54) TERMINAL DEVICE, CONTENT RECORDING SYSTEM, TITLE KEY RECORDING METHOD, AND COMPUTER PROGRAM

(75) Inventors: Takahiro Yamaguchi, Osaka (JP); Toshihisa Nakano, Osaka (JP); Motoji Ohmori, Osaka (JP); Kaoru Murase, Nara (JP)

(73) Assignee: Panasonic Corporation, Osaka (JP)

( * ) Notice: Subject to any disclaimer, the term of this patent is extended or adjusted under 35 U.S.C. 154(b) by 237 days.

(21) Appl. No.: 13/879,909

(22) PCT Filed: Apr. 26, 2012

(86) PCT No.: PCT/JP2012/002891
§ 371 (c)(1),
(2), (4) Date: Apr. 17, 2013

(87) PCT Pub. No.: WO2012/153485
PCT Pub. Date: Nov. 15, 2012

(65) Prior Publication Data
US 2013/0315565 A1 Nov. 28, 2013

Related U.S. Application Data

(60) Provisional application No. 61/483,874, filed on May 9, 2011.

(51) Int. Cl.
*H04N 9/80* (2006.01)
(Continued)

(52) U.S. Cl.
CPC ............... *H04N 9/79* (2013.01); *H04L 9/0825* (2013.01); *H04L 9/3263* (2013.01); *H04N 21/4147* (2013.01); *H04N 21/6334* (2013.01)

(58) Field of Classification Search
CPC ....... H04L 9/00; H04L 9/0825; H04L 9/3263; H04N 9/79; H04N 21/4147; H04N 21/6334
See application file for complete search history.

(56) References Cited

U.S. PATENT DOCUMENTS 6,728,379 B1 * 4/2004 Ishibashi et al. .............. 380/278

FOREIGN PATENT DOCUMENTS

| JP | 7-123086 | 5/1995 |
| JP | 2010-140298 | 6/2010 |
| JP | 2010-251974 | 11/2010 |

OTHER PUBLICATIONS

International Search Report issued Jul. 17, 2012 in International (PCT) Application No. PCT/JP2012/002891.
(Continued)

*Primary Examiner* — Huy T Nguyen
(74) *Attorney, Agent, or Firm* — Wenderoth, Lind & Ponack, L.L.P.

(57) ABSTRACT

A terminal device 500 that is connected to a key distribution device 400 via a network, and in which a recording medium device 600 is mounted, the key distribution device 400 being for distributing a title key necessary for use of content, the recording medium device 600 being for storing therein the content and the title key. The recording medium device 600 and the key distribution device 400 perform mutual authentication and share shared keys that are identical to each other. The terminal device 500 comprises: a reception unit that receives an encrypted title key from the key distribution device 400, the encrypted title key being the title key encrypted with the shared key of the key distribution device 400; and a transfer unit 513 that transmits the encrypted title key to the recording medium device 600. Upon completion of the mutual authentication between the recording medium device 600 and the key distribution device 400, the reception unit and the transfer unit 513 refrain from any involvement with communication data except reception and transmission thereof, the communication data being exchanged between the recording medium device 600 and the key distribution device 400 with use of the shared keys.

12 Claims, 31 Drawing Sheets

(51) Int. Cl.
*H04N 9/79* (2006.01)
*H04L 9/08* (2006.01)
*H04L 9/32* (2006.01)
*H04N 21/6334* (2011.01)
*H04N 21/4147* (2011.01)

(56) References Cited

OTHER PUBLICATIONS

Advanced Access Content System (AACS), Prepared Video Book, Revision 0.95, Feb. 19, 2009.

\* cited by examiner

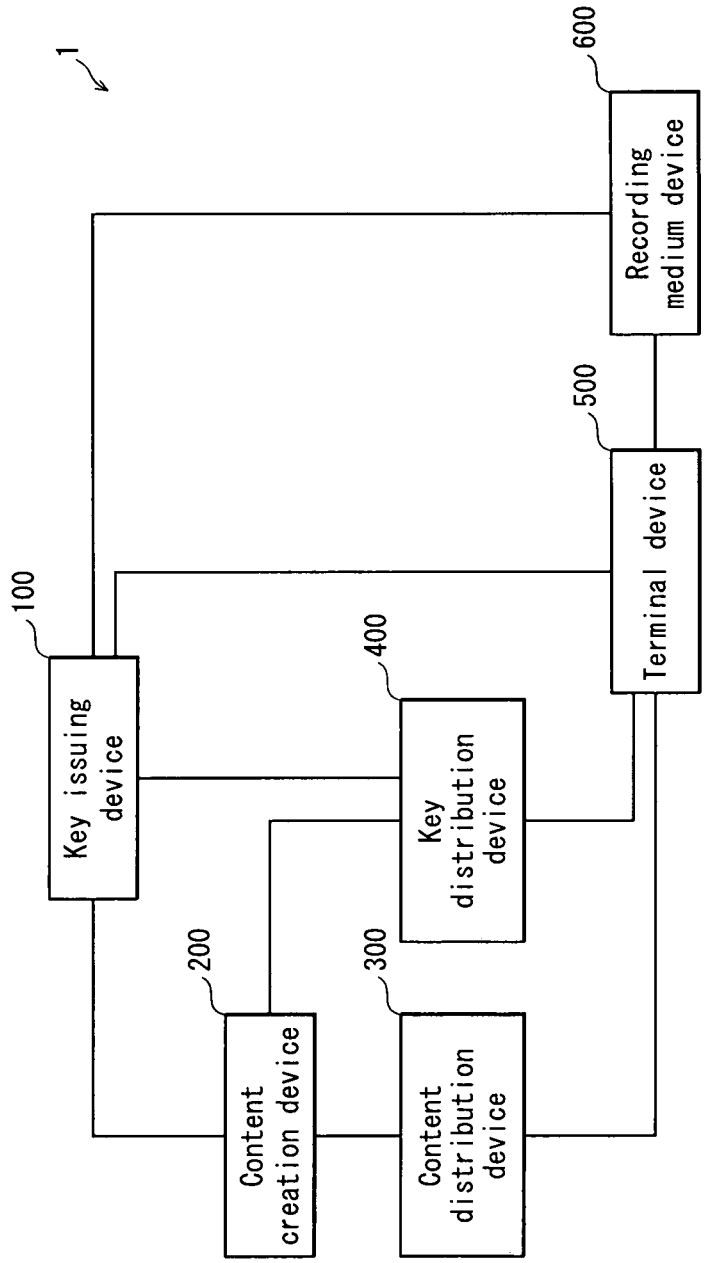

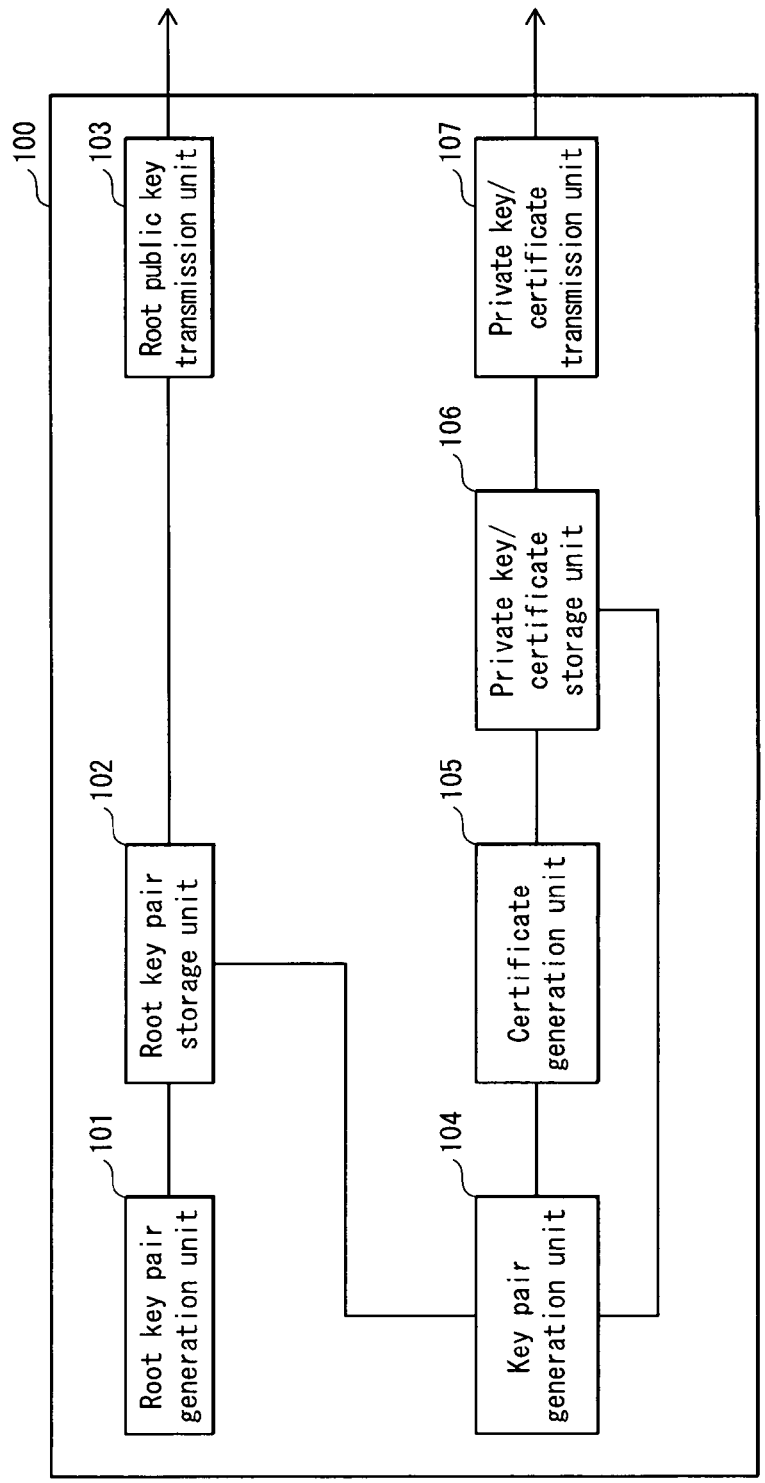

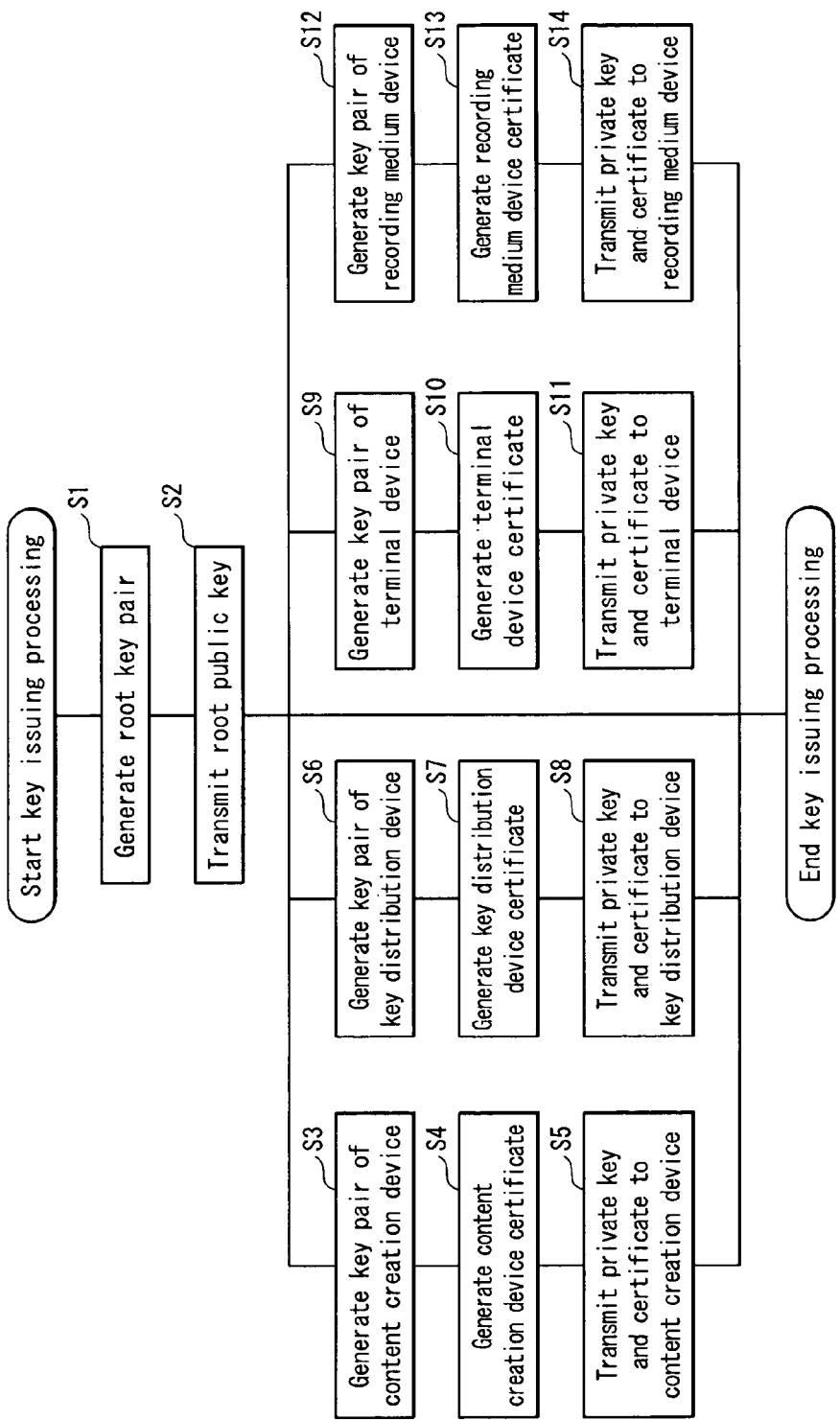

FIG. 12

| Content identification information | Title key | UR |
|---|---|---|
| 0001 | Kt-0001 | Playback: 3 times, Moving: Not permitted |
| 0002 | Kt-0002 | Playback: Unlimited, Moving: Permitted |
| 0003 | Kt-0003 | Playback: 10 times, Moving: Permitted |
| ... | ... | ... |

420

421

422

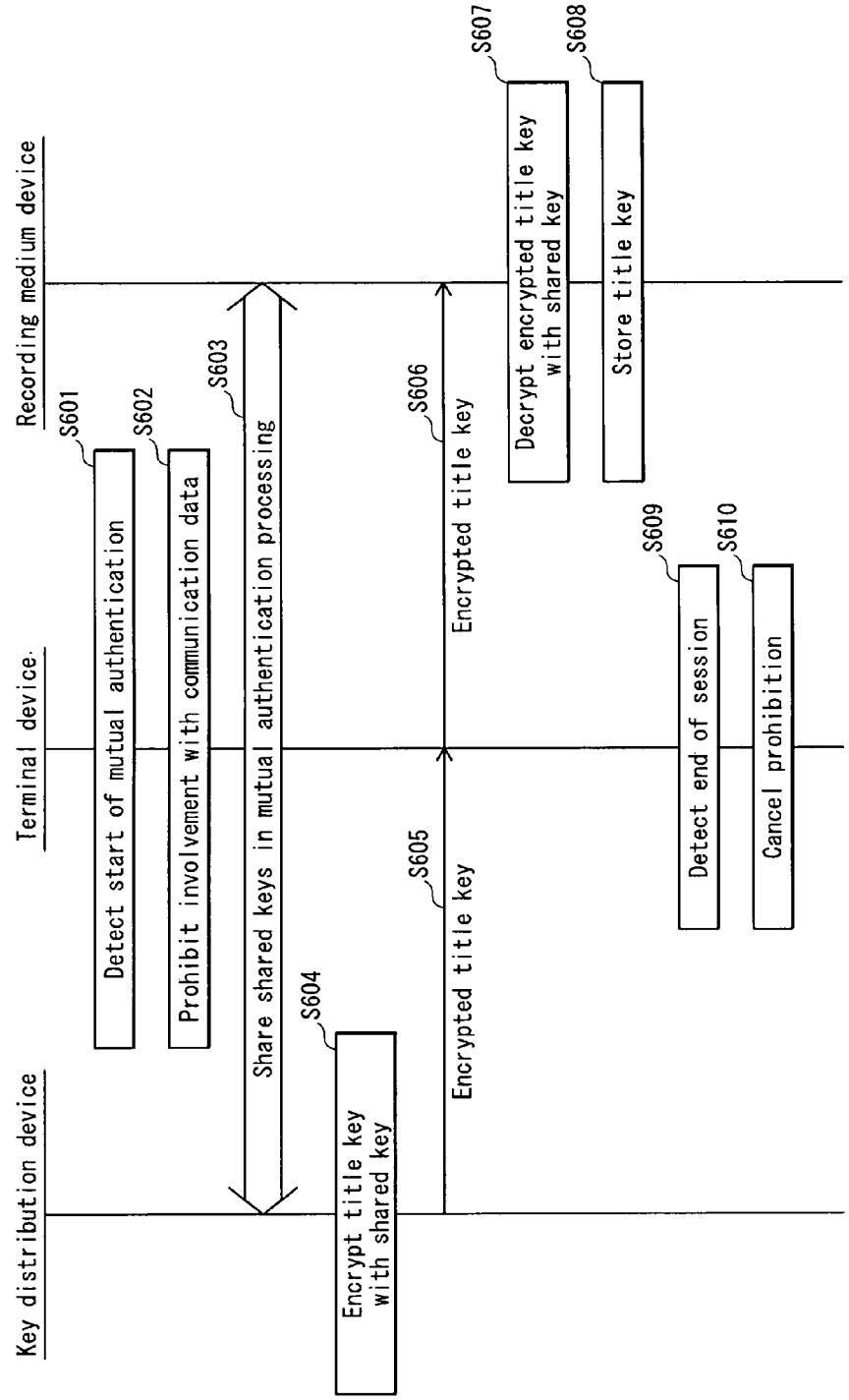

TERMINAL DEVICE, CONTENT RECORDING SYSTEM, TITLE KEY RECORDING METHOD, AND COMPUTER PROGRAM

This application claims the benefit of U.S. Provisional Application No. 61/483,874, filed May 9, 2011.

TECHNICAL FIELD

The present invention relates to a technology for recording a digital work distributed via a network into a recording medium device.

BACKGROUND ART

A content distribution system has been widespread in recent years. In the content distribution system, a digital work (hereinafter "content") such as a movie or music is distributed via a network. For example, a personal computer (hereinafter "PC") of a user receives content from a content server, and records the content onto an SD memory card or the like purchased by the user.

Since content distributed via a network is digital data having high image quality and high sound quality, copyright protection measures are necessary to prevent distribution of unauthorized copy or the like.

One of copyright protection standards for content is an Advanced Access Content System (AACS). The AACS is a copyright protection standard used in Blu-ray Discs (BD)™

In the AACS, a device key is issued from a key issuing device to a playback device, and a media key block (MKB) is issued from the key issuing device to a content creation device. The content creation device protects content with use of the MKB and a title key that the content creation device itself creates. The MKB, the title key, and the protected content are then recorded onto a BD-ROM to be sold. The playback device removes the protection of the content with use of the device key, the MKB, and the title key, and plays back the content.

CITATION LIST

Non-Patent Literature

[Non-Patent Literature 1]
Advanced Access Content System (AACS) Prepared Video Book Revision 0.95

SUMMARY OF INVENTION

Technical Problem

The use of the AACS has been recently considered as copyright protection measures for the content that is to be recorded onto a next generation SD memory card composed of a controller and a flash memory. In the AACS, content is encrypted by a content creator with use of a title key and thereafter distributed. Accordingly, a PC needs to record, onto an SD memory card, the encrypted content, the title key, other data necessary for the use of the content, and so on. At this point, there is a risk that a malicious program that runs on the PC will acquire the title key in an unauthorized manner.

The present invention has been achieved in view of the above problem, and an aim thereof is to provide a terminal device, a content recording system, a title key recording method, and a computer program that each prevent unauthorized acquisition of a title key. Specifically, when encrypted content and a title key, which are distributed via a network, are to be recorded onto a recording medium device such as an SD memory card, the terminal device, the content recording system, the title key recording method, and the computer program each prevent unauthorized acquisition of the title key.

Solution to Problem

One aspect of the present invention is a terminal device that is connected to a key distribution device via a network, and in which a recording medium device is mounted, the key distribution device being for distributing a title key necessary for use of content, the recording medium device storing therein the content and the title key, the terminal device being for transferring the title key from the recording medium device to a different recording medium device, the recording medium device and the key distribution device performing mutual authentication and sharing first shared keys that are identical to each other, the terminal device comprising: a first reception unit configured to receive a first encrypted title key from the recording medium device, the first encrypted title key being the title key encrypted with the first shared key of the recording medium device; and a first transfer unit configured to transmit the first encrypted title key to the key distribution device, wherein upon completion of the mutual authentication between the recording medium device and the key distribution device, the first reception unit and the first transfer unit refrain from any involvement with communication data except reception and transmission thereof, the communication data being exchanged between the recording medium device and the key distribution device with use of the first shared keys.

Advantageous Effects of Invention

According to this structure, upon completion of the mutual authentication between the recording medium device and the key distribution device, the terminal device refrains from any involvement with communication data except reception and transmission thereof, the communication data being exchanged between the recording medium device and the key distribution device with use of the shared keys. This prevents the title key from being acquired in an unauthorized manner.

BRIEF DESCRIPTION OF DRAWINGS

FIG. 1 shows the structure of a content distribution system 1.

FIG. 2 is a block diagram showing a key issuing device 100.

FIG. 4 is a flowchart showing operations of key issuing processing.

FIG. 12 shows the data structure of a content right table 420.

FIG. 32 is a diagram used to explain the modification.

DESCRIPTION OF EMBODIMENTS

Figure 3A:
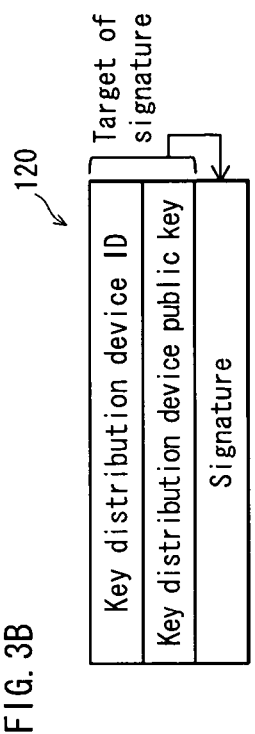
FIGS. 3A to 3D each show the data structure of a certificate generated by the key issuing device 100.

1. Process by which Aspect of the Present Invention was Achieved

The following describes the process by which the present inventors have achieved a content distribution system which is an aspect of the present invention.

Content distributed via a network may be recorded onto a recording medium device such as an SD memory card by either of the following methods. One of the methods is to record the content with use of a dedicated hardware recorder. The other is to record the content with use of a software recorder that operates on a PC.

The method for downloading content with use of a software recorder that operates on a PC is relatively easy. As such, this method seems to be more popular among users. However, such a software recorder lacks strength in security as compared to a hardware recorder, and thus is more likely to leak confidential information used in the AACS.

There are already malicious vendors that analyze a weak software recorder, acquire a device key allocated to the software recorder, and develop and sell programs that duplicate content in an unauthorized manner with use of the device key.

If a device key used in the AACS is acquired in an unauthorized manner, a malicious program pretending to be an authorized terminal device may acquire, from a key distribution device, a title key for decrypting content. As described above, a title key is key data used for decryption of encrypted content, and therefore should be protected from being acquired by a malicious program.

The present inventors continuously conducted the study for preventing a malicious program from acquiring a title key, and achieved a content distribution system described below.

2. Embodiment 1

The following describes a content distribution system 1 as one aspect of the present invention.

<2-1. Outline>

FIG. 1 shows the overall structure of the content distribution system 1.

The content distribution system 1 includes a key issuing device 100, a content creation device 200, a content distribution device 300, a key distribution device 400, a terminal device 500, and a recording medium device 600.

The key issuing device 100 is owned by an authorized authority which serves as a basis of security of the content distribution system 1. The key issuing device 100 generates and issues an authorized private key and an authorized public key certificate, for each of the devices in the content distribution system 1.

The content creation device 200 generates content and a title key for encrypting the content. Then, the content creation device 200 transmits encrypted content, which is the content encrypted with the title key, to the content distribution device 300, and transmits the title key to the key distribution device 400.

The terminal device 500 is, for example, a PC located at a user's home. The terminal device 500 is connectable to the content distribution device 300 and the key distribution device 400, via a network such as the Internet.

Also, the recording medium device 600, which is an SD memory card or the like, is mountable in the terminal device 500. The terminal device 500 receives the encrypted content from the content distribution device 300 via the network, and writes the encrypted content into the recording medium device 600 mounted therein. Also, the terminal device 500 receives the title key from the key distribution device 400 via the network, and writes the title key into the recording medium device 600.

At this time, the title key is transferred via a secure communication channel (session), which is established as a result of mutual authentication between the key distribution device 400 and the recording medium device 600. Accordingly, the recording medium device 600 can acquire the title key from the key distribution device 400 without letting the terminal device 500 know the details of the title key.

The following describes in detail the structure of each device and processing by each device.

<2-2. Structure of Key Issuing Device 100>

The key issuing device 100 is a computer system including a processor, a ROM, a RAM, and a hard disk. The key issuing device 100 performs key issuing processing for generating and issuing an authorized private key and an authorized public key certificate, for each of the devices in the content distribution system 1.

FIG. 2 is a block diagram showing the functional structure of the key issuing device 100.

As shown in FIG. 2, the key issuing device 100 includes a root key pair generation unit 101, a root key pair storage unit 102, a root public key transmission unit 103, a key pair generation unit 104, a certificate generation unit 105, a private key/certificate storage unit 106, and a private key/certificate transmission unit 107.

The root key pair generation unit 101 generates a root key pair for the key issuing device 100, which is the security core in the content distribution system 1. The root key pair is composed of a root public key and a root private key.

The root key pair storage unit 102 stores the root key pair generated by the root key pair generation unit 101.

The root public key transmission unit 103 transmits the root public key stored in the root key pair storage unit 102, to the key distribution device 400, the terminal device 500, and the recording medium device 600. The root public key is used when the key distribution device 400, the terminal device 500, and the recording medium device 600 verify a signature generated by the key issuing device 100.

The key pair generation unit 104 generates a key pair for each of the content creation device 200, the key distribution device 400, the terminal device 500, and the recording medium device 600.

Specifically, the key pair generation unit 104 generates a content creation device key pair composed of a content creation device public key and a content creation device private key to be embedded in the content creation device 200. Also, the key pair generation unit 104 generates a key distribution device key pair composed of a key distribution device public key and a key distribution device private key to be embedded in the key distribution device 400. Also, the key pair generation unit 104 generates a terminal device key pair composed of a terminal device public key and a terminal device private key to be embedded in the terminal device 500. Furthermore, the key pair generation unit 104 generates a recording medium device key pair composed of a recording medium device public key and a recording medium device private key to be embedded in the recording medium device 600.

The certificate generation unit 105 generates a public key certificate to be embedded in each of the content creation device 200, the key distribution device 400, the terminal device 500, and the recording medium device 600.

FIG. 3A to 3D each show an example of the public key certificate generated by the certificate generation unit 105.

FIG. 3A shows a content creation device certificate 110 distributed to the content creation device 200. The content creation device certificate 110 is composed of a content creation device ID, a content creation device public key, and a signature. The content creation device certificate 110 is generated as follows. First, the certificate generation unit 105 adds the content creation device ID, which is an identifier of the content creation device 200, to the content creation device public key generated by the key pair generation unit 104, and treats the resultant data as signature target data. The certificate generation unit 105 generates a signature by applying a signature verification algorithm to the signature target data, with use of the root private key as a signature generation key. Then, the certificate generation unit 105 generates the content creation device certificate 110 composed of the content creation device ID, the content creation device public key, and the signature.

Figure 3B:
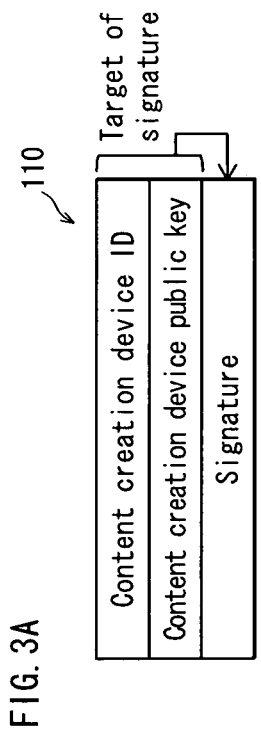
Figure 3C:
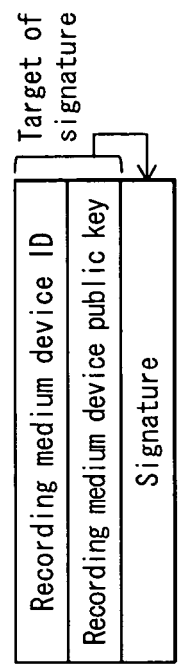
Figure 3D:
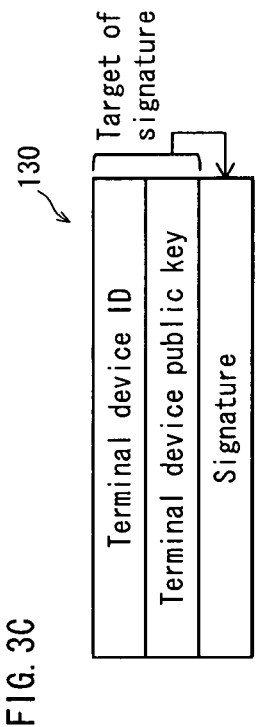

FIG. 3B shows a key distribution device certificate 120 distributed to the key distribution device 400. FIG. 3C shows a terminal device certificate 130 distributed to the terminal device 500. FIG. 3D is a recording medium device certificate 140 distributed to the recording medium device 600. These public key certificates are generated similarly to the content creation device certificate 110.

The private key/certificate storage unit 106 stores, as pairs, (i) the private keys of the respective devices, which are generated by the key pair generation unit 104, and (ii) the public key certificates of the respective devices, which are generated by the certificate generation unit 105.

The private key/certificate transmission unit 107 transmits a corresponding pair to each device, from among the pairs of the private keys and the public key certificates stored in the private key/certificate storage unit 106. Specifically, the private key/certificate transmission unit 107 transmits the content creation device certificate 110 to the content creation device 200, the key distribution device certificate 120 to the key distribution device 400, the terminal device certificate 130 to the terminal device 500, and the recording medium device certificate 140 to the recording medium device 600.

<2-3. Operation of Key Issuing Processing>

FIG. 4 is a flowchart showing operations of the key issuing processing by the key issuing device 100.

The key issuing device 100 generates a root key pair consisting of a root public key and a root private key (step S1), and stores the root key pair into the root key pair storage unit 102. In response to a request for the root public key, the root public key transmission unit 103 transmits the root public key to the content creation device 200, the key distribution device 400, the terminal device 500, and the recording medium device 600 (step S2).

The key pair generation unit 104 generates the key pair of the content creation device 200 (step S3). The certificate generation unit 105 generates the content creation device certificate 110 (step S4). The private key/certificate transmission unit 107 transmits the content creation device private key and the content creation device certificate 110 to the content creation device 200 (step S5).

The key pair generation unit 104 generates the key pair of the key distribution device 400 (step S6). The certificate generation unit 105 generates the key distribution device certificate 120 (step S7). The private key/certificate transmission unit 107 transmits the key distribution device private key and the key distribution device certificate 120 to the key distribution device 400 (step S8).

The key pair generation unit 104 generates the key pair of the terminal device 500 (step S9). The certificate generation unit 105 generates the terminal device certificate 130 (step S10). The private key/certificate transmission unit 107 transmits the terminal device private key and the terminal device certificate 130 to a device that manufactures the terminal device 500 (step S11).

The key pair generation unit 104 generates the key pair of the recording medium device 600 (step S12). The certificate generation unit 105 generates the recording medium device certificate 140 (step S13). The private key/certificate transmission unit 107 transmits the recording medium device private key and the recording medium device certificate 140 to a device that manufactures the recording medium device 600 (step S14).

<2-4. Structure of Content Creation Device 200>

The content creation device 200 is a computer system including a processor, a ROM, a RAM, and a hard disk. The content creation device 200 performs content creation processing for generating and encrypting content.

Figure 5:
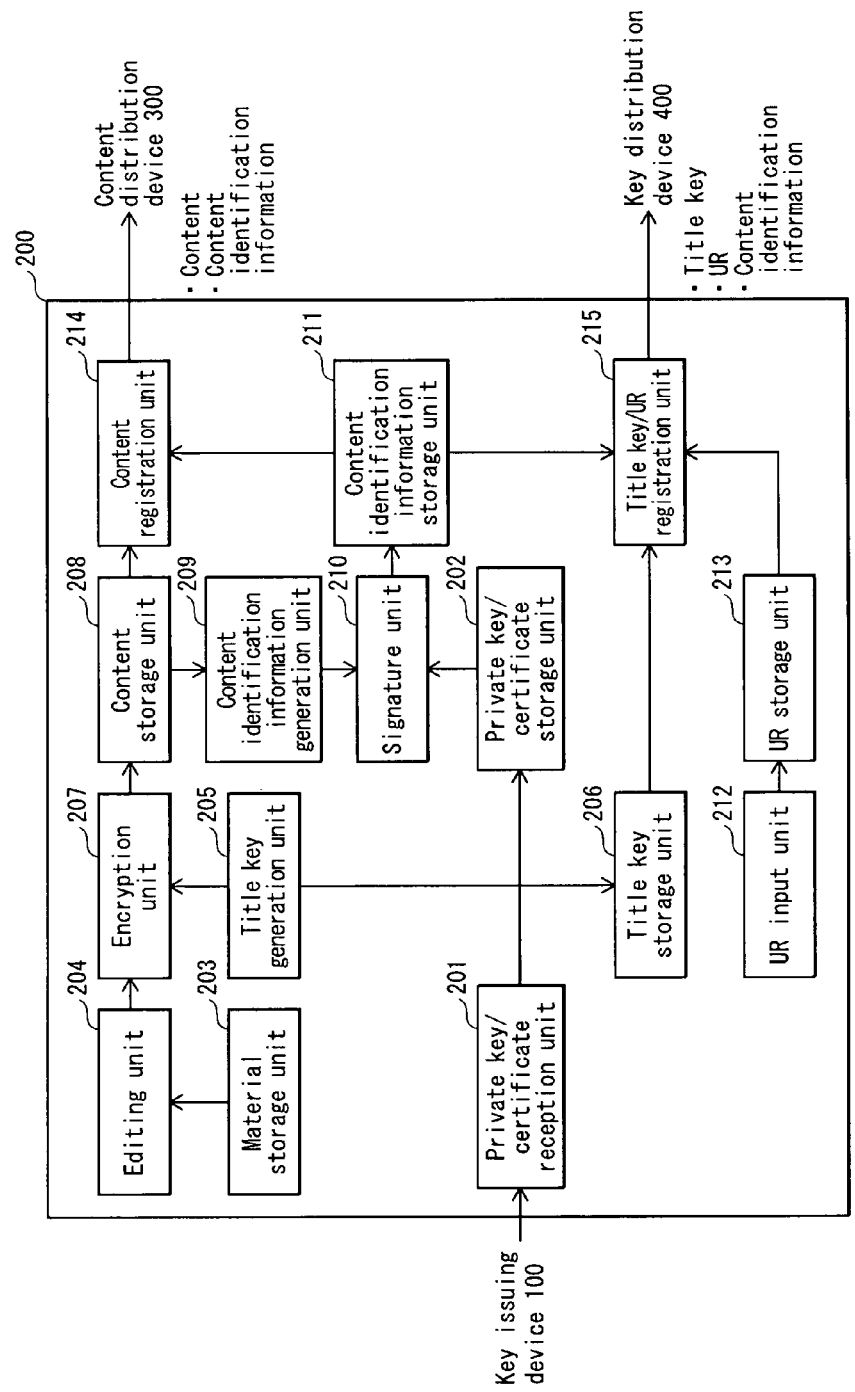
FIG. 5 is a block diagram showing a content creation device 200.

FIG. 5 is a block diagram showing the functional structure of the content creation device 200.

As shown in FIG. 5, the content creation device 200 includes a private key/certificate reception unit 201, a private key/certificate storage unit 202, a material storage unit 203, an editing unit 204, a title key generation unit 205, a title key storage unit 206, an encryption unit 207, a content storage unit 208, a content identification information generation unit 209, a signature unit 210, a content identification information storage unit 211, a UR input unit 212, a UR storage unit 213, a content registration unit 214 and a title key/UR registration unit 215.

The private key/certificate reception unit 201 receives the content creation device private key and the content creation device certificate 110 from the key issuing device 100.

The private key/certificate storage unit 202 stores the content creation device private key and the content creation device certificate 110 received by the private key/certificate reception unit 201.

The material storage unit 203 stores a plurality of material data pieces (video data and audio data of a movie or the like).

The editing unit 204 creates a movie or the like by combining the plurality of material data pieces stored in the material storage unit 203.

The title key generation unit 205 generates a title key that is an encryption key for encrypting the movie or the like. For example, the title key generation unit 205 generates a 128-bit random number as a title key.

The title key storage unit 206 stores the title key generated by the title key generation unit 205.

The encryption unit 207 encrypts the movie or the like generated by the editing unit 204 to generate content. Specifically, the encryption unit 207 applies an encryption algorithm E1 to the movie or the like with use of the title key stored in the title key storage unit 206. Hereinafter, the movie or the like encrypted with the title key is referred to as "content" unless otherwise specified. One example of the encryption algorithm E1 is a DES (Data Encryption Standard).

The content storage unit 208 stores the content generated by the encryption unit 207.

The content identification information generation unit 209 generates content identification information that uniquely identifies the content from among the contents stored in the content storage unit 208. The content identification information is generated as follows, for example.

The content identification information generation unit 209 generates partial contents by dividing the content into pieces. Then, the content identification information generation unit 209 calculates a hash value for each partial content. The content identification information generation unit 209 concatenates the hash values to obtain concatenated data, and calculates a hash value for the concatenated data. The content identification information generation unit 209 treats the hash value of the concatenated data as the content identification information.

The signature unit 210 generates a signature by applying a signature generation algorithm to the content identification information generated by the content identification information generation unit 209, with use of the content creation device private key as a signature generation key. With the signature generated by the signature unit 210, the content identification information is protected from tampering.

The content identification information storage unit 211 stores the content identification information generated by the content identification information generation unit 209 and the signature generated by the signature unit 210.

The UR input unit 212 includes input devices such as a keyboard and a mouse. The UR input unit 212 receives an input of a Usage Rule (hereinafter "UR") input by a content creator via the input devices. The UR is a condition related to the use of the content, such as the number of times playback of the content is permitted or whether or not moving of the content is permitted.

The UR storage unit 213 stores therein the UR received by the UR input unit 212.

The content registration unit 214 registers, with the content distribution device 300, the content stored in the content storage unit 208 and the content identification information stored in the content identification information storage unit 211.

The title key/UR registration unit 215 registers, with the key distribution device 400, the title key stored in the title key storage unit 206, the UR stored in the UR storage unit 213, and the content identification information stored in the content identification information storage unit 211.

<2-5. Operations of Content Creation Processing>

Figure 6:
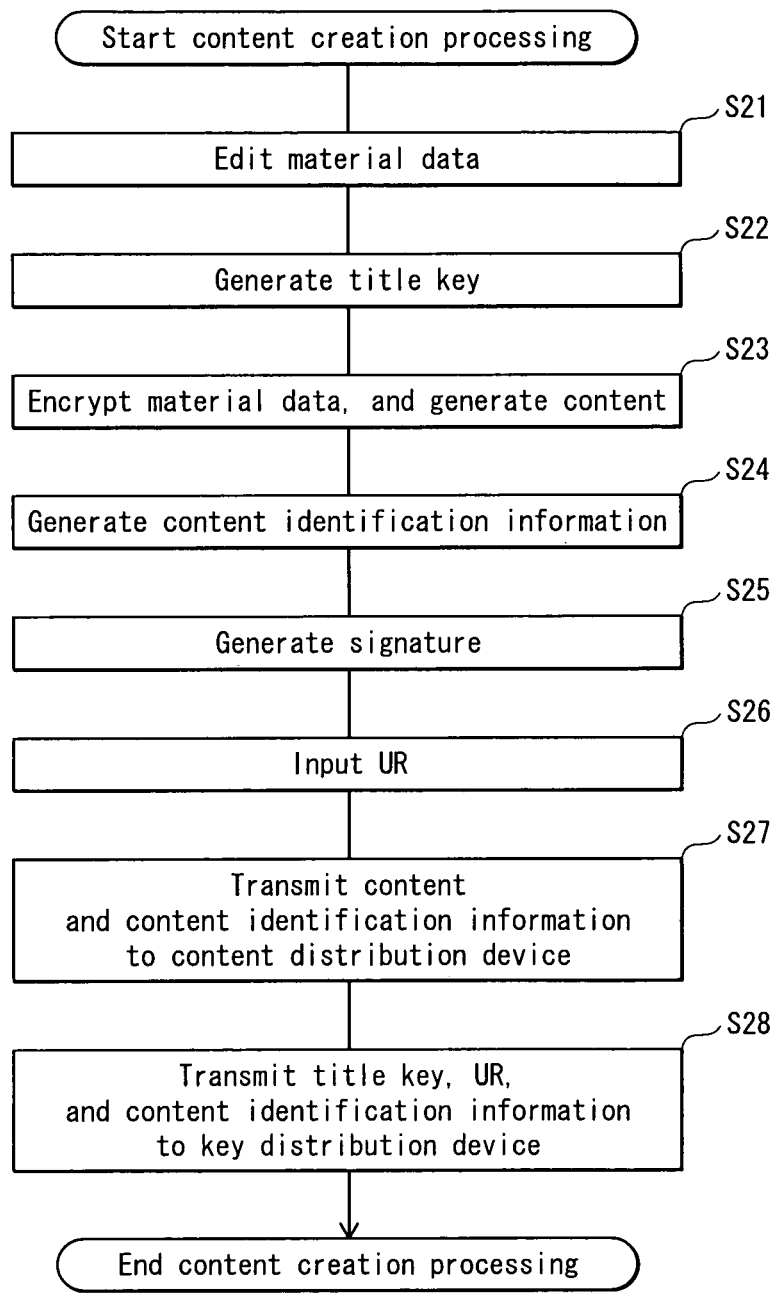
FIG. 6 is a flowchart showing operations of content creation processing.

FIG. 6 is a flowchart showing operations of the content creation processing by the content creation device 200.

Prior to the content creation processing, the private key/certificate reception unit 201 receives the content creation device private key and the content creation device certificate from the key issuing device 100 and stores them into the private key/certificate storage unit 202.

The editing unit 204 generates a movie or the like by combining material data pieces stored in the material storage unit 203 (step S21).

The title key generation unit 205 generates a title key (step S22), and stores the title key into the title key storage unit 206.

The encryption unit 207 encrypts material data (i.e., movie or the like) edited by the editing unit 204, and generates content (step S23). The encryption unit 207 stores the content thus generated into the content storage unit 208.

The content identification information generation unit 209 reads the content stored in the content storage unit 208, and generates content identification information that uniquely identifies the content (step S24). The signature unit 210 generates a signature for the content identification information generated by the content identification information generation unit 209 (step S25). The content identification information and the signature thus generated are stored in the content identification information storage unit 211.

Subsequently, the UR input unit 212 receives a UR input by a content creator (step S26). The UR thus input is stored in the UR storage unit 213.

The content registration unit 214 pairs the content and the content identification information, and transmits the pair to the content distribution device 300 (step S27).

The title key/UR registration unit 215 puts together the title key, the UR, and the content identification information as a set, and transmits the set to the key distribution device 400 (step S28).

<2-6. Structure of Content Distribution Device 300>

The content distribution device 300 is a computer system including a processor, a ROM, a RAM, a hard disk, and a network connection unit.

The content distribution device 300 receives content from the content creation device 200 and stores the content. Also, the content distribution device 300 performs content distribution processing for distributing the content to the terminal device 500 connected via a network.

Figure 7:
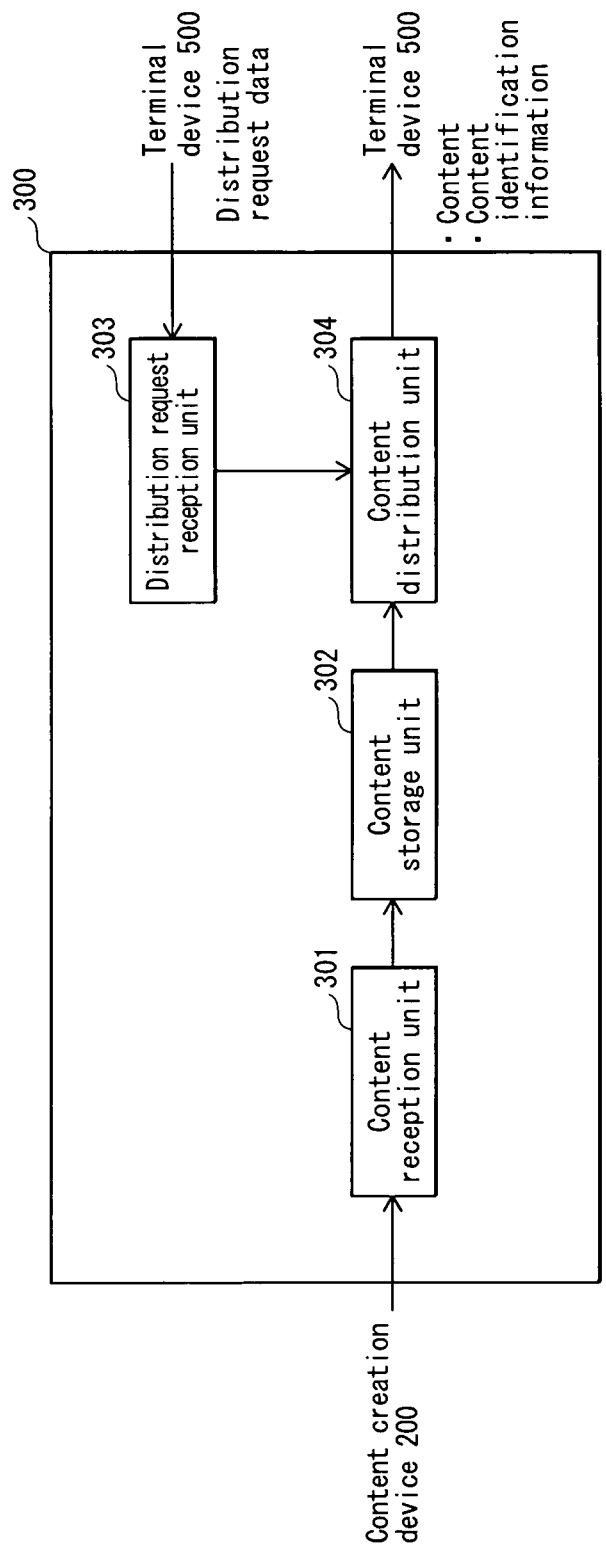
FIG. 7 is a block diagram showing a content distribution device 300.

FIG. 7 is a block diagram showing the functional structure of the content distribution device 300.

As shown in FIG. 7, the content distribution device 300 includes a content reception unit 301, a content storage unit 302, a distribution request reception unit 303, and a content distribution unit 304.

The content reception unit 301 receives a pair of content and content identification information from the content creation device 200.

Figure 8:
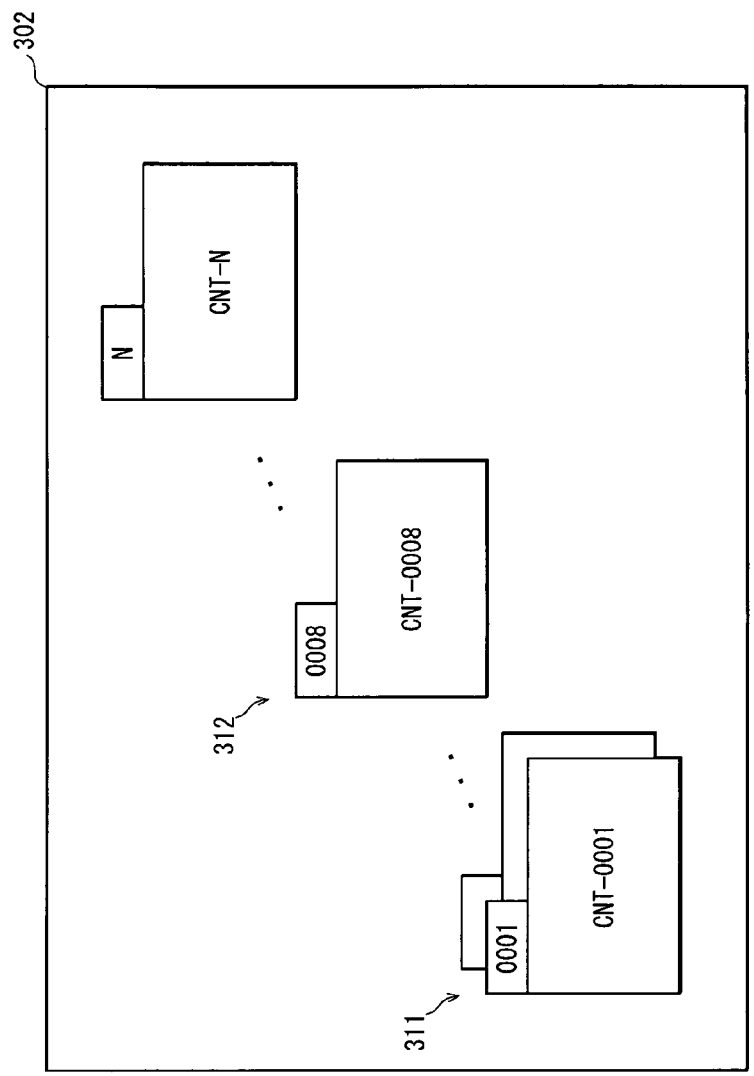
FIG. 8 shows content data stored in a content storage unit 302.

The content storage unit 302 stores the pair of content and content identification information received by the content reception unit 301. FIG. 8 shows data stored in the content storage unit 302. As shown in FIG. 8, the content storage unit 302 stores pieces content data each composed of content and content identification information. For example, content data 311 is composed of a content identifier "0001" and content "CNT-0001". Content data 312 is composed of a content identifier "0008" and content "CNT-0008".

Figure 9:
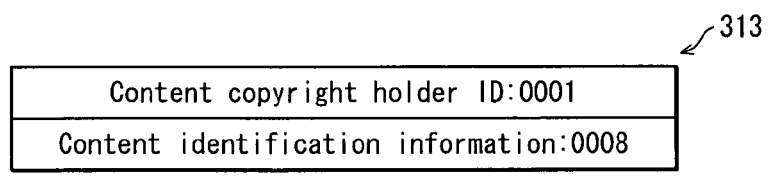
FIG. 9 shows the data structure of distribution request data.

Upon receiving distribution request data from the terminal device 500, the distribution request reception unit 303 instructs the content distribution unit 304 to distribute content. FIG. 9 shows an example of distribution request data. As shown in FIG. 9, distribution request data 313 includes a content copyright holder ID and content identification information. The distribution request reception unit 303 notifies the content distribution unit 304 of the content identification information "0008" included in the distribution request data 313.

Upon being instructed by the distribution request reception unit 303 to distribute content, the content distribution unit 304 searches the content storage unit 302 for the content corresponding to the content identification information notified by the distribution request reception unit 303. If finding the corresponding content, the content distribution unit 304 reads the content and the content identification information from the content storage unit 302 and distributes them to the terminal device 500.

<2-7 Operations of Content Distribution Processing>

Figure 10:
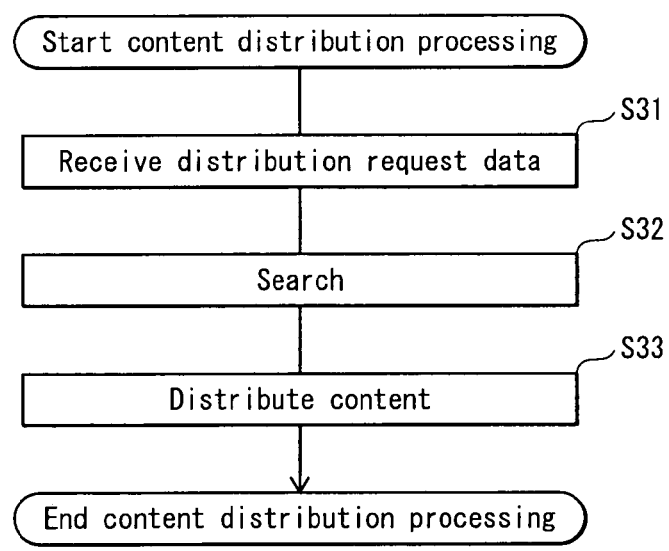
FIG. 10 is a flowchart showing operations of content distribution processing.

FIG. 10 is a flowchart showing operations of the content distribution processing by the content distribution device 300.

Prior to the content distribution processing, the content reception unit 301 receives content data composed of content and content identification information from the content creation device 200, and the content storage unit 302 stores the content data.

The distribution request reception unit 303 receives distribution request data from the terminal device 500 (step S31). The distribution request reception unit 303 instructs the content distribution unit 304 to distribute content.

Upon being instructed to distribute the content, the content distribution unit 304 searches the content storage unit 302 for the content corresponding to the content identification information included in the distribution request data (step S32). If finding the corresponding content, the content distribution unit 304 distributes the content and the content identification information to the terminal device 500 that has transmitted the distribution request data (step S33). If not finding the corresponding content, the content distribution unit 304 may notify the terminal device 500 that the content was not found.

<2-8. Structure of Key Distribution Device 400>

The content distribution device 400 is a computer system including a processor, a ROM, a RAM, a hard disk, and a network connection unit. The key distribution device 400 performs key distribution processing for transmitting a title key used for decryption of content to the recording medium device 600.

Figure 11:
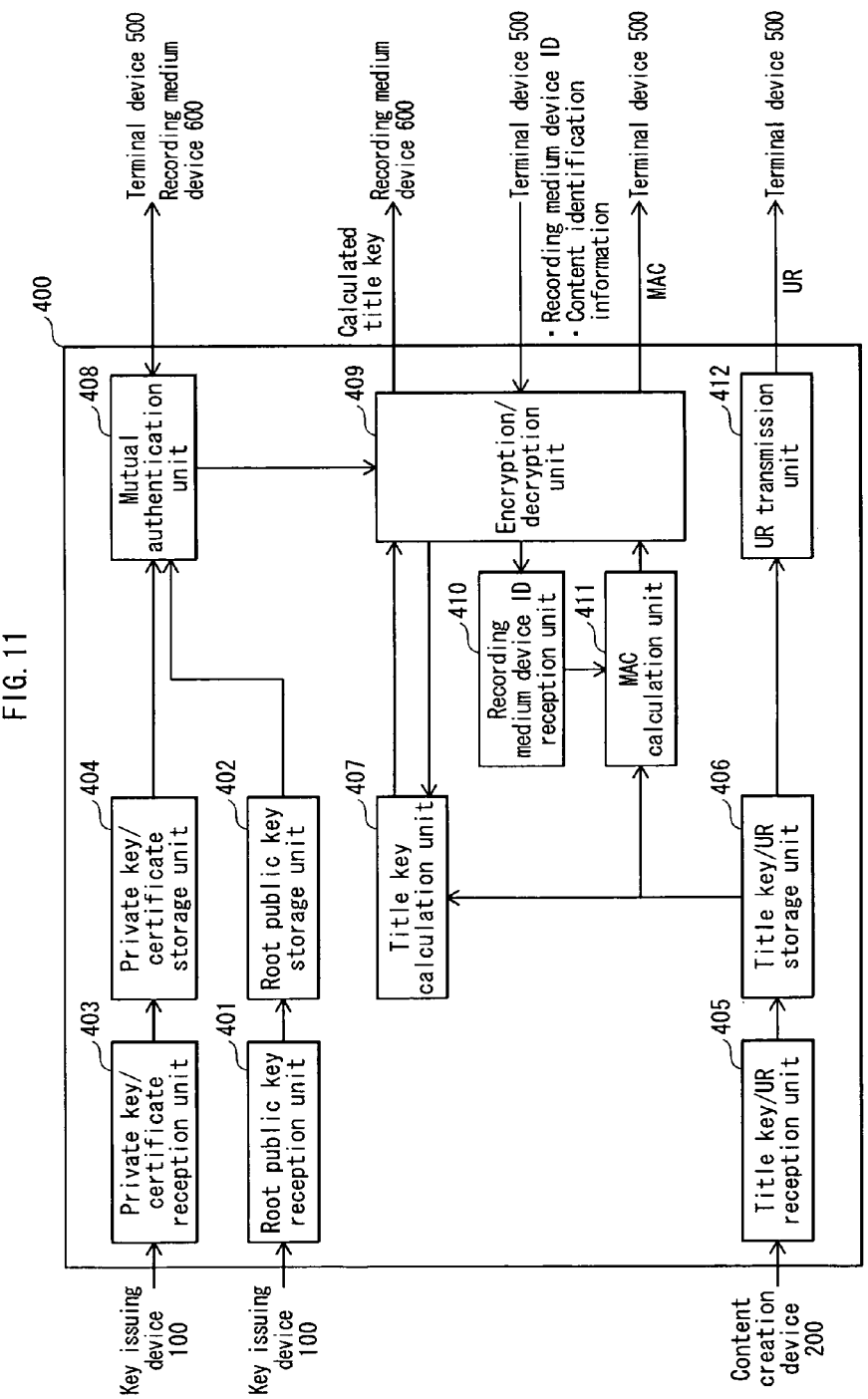
FIG. 11 is a block diagram showing a key distribution device 400.

FIG. 11 is a block diagram showing the functional structure of the content distribution device 400.

As shown in FIG. 11, the key distribution device 400 includes a root public key reception unit 401, a root public key storage unit 402, a private key/certificate reception unit 403, a private key/certificate storage unit 404, a title key/UR reception unit 405, a title key/UR storage unit 406, a title key calculation unit 407, a mutual authentication unit 408, an encryption/decryption unit 409, a recording medium device ID reception unit 410, a MAC calculation unit 411, and a UR transmission unit 412.

The root public key reception unit 401 receives the root public key from the key issuing device 100.

The root public key storage unit 402 stores the root public key received by the root public key reception unit 401.

The private key/certificate reception unit 403 receives the key distribution device private key and the key distribution device certificate from the key issuing device 100.

The private key/certificate storage unit 404 stores the key distribution device private key and the key distribution device certificate received by the private key/certificate reception unit 403.

The title key/UR reception unit 405 receives a set of a title key, a UR, and a content identifier from the content creation device 200.

The title key/UR storage unit 406 receives the title key, the UR, and the content identifier from the title key/UR reception unit 405, and registers them with a content right table 420 shown in FIG. 12. As shown in FIG. 12, the content right table 420 includes pieces of content right information 421, 422, . . . . For example, the content right information 421 includes content identification information "0001", a title key "Kt-0001", and a UR "Playback: 3 times, Moving: Not permitted". Also, the content right information 422 includes content identification information "0002", a title key "Kt-0002", and a UR "Playback: Unlimited, Moving: Permitted".

The title key calculation unit 407 acquires the title key and the UR from the title key/UR storage unit 406. Then, the title key calculation unit 407 calculates a hash value for the UR. The title key calculation unit 407 generates a calculated title key by performing an invertible calculation using the hash value of the UR and the title key. For example, the title key calculation unit 407 performs an exclusive OR (XOR) operation on the hash value of the UR and the title key, and thereby generates the calculated title key (XORed title key).

The calculated title key generated by the title key calculation unit 407 is passed to the encryption/decryption unit 409, encrypted by the encryption/decryption unit 409 with a shared key shared with the recording medium device 600, and thereafter transmitted.

The mutual authentication unit 408 performs mutual authentication with the terminal device 500 to share a shared key identical with a shared key of the terminal device 500. The mutual authentication is performed with use of a method such as Difiee-Hellman method for exchanging keys, which is based on the complexity of prime factorization, or the Elliptic Curve Difiee-Hellman (EC-DH) method for exchanging keys, which is based on the discrete logarithm problem on elliptic curves. Similarly, the mutual authentication unit 408 performs mutual authentication with the recording medium device 600, and shares a shared key with the recording medium device 600.

The encryption/decryption unit 409 uses the shared key shared with the terminal device 500 to encrypt and decrypt data exchanged with the terminal device 500. Also, the encryption/decryption unit 409 uses the shared key shared with the recording medium device 600 to encrypt the calculated title key generated by the title key calculation unit 407, and transmits the calculated title key thus encrypted to the recording medium device 600.

The recording medium device ID reception unit 410 receives, from the terminal device 500 via the encryption/decryption unit 409, a recording medium device ID for identifying a recording medium device to which content is to be written. Note that "via the encryption/decryption unit 409" means that the encryption/decryption unit 409 receives a recording medium device ID encrypted with the shared key, and decrypts the encrypted recording medium device ID with the shared key before transmitting the recording medium device ID to the recording medium device ID reception unit 410.

The MAC calculation unit 411 calculates a Message Authentication Code (MAC) from the title key stored in the title key/UR storage unit 406 and the recording medium device ID received by the recording medium device ID reception unit 410. For example, the MAC calculation unit 411 generates the MAC, which is used to verify the integrity of the title key, by applying a MAC generation algorithm to the title key as an authentication message with use of the recording medium device ID as a key. The MAC calculation unit 411 transmits the MAC thus generated to the terminal device 500 via the encryption/decryption unit 409. The MAC generated by the MAC calculation unit 411 is written by the terminal device 500 into the recording medium device 600.

In the present embodiment, the MAC is used as authentication information for associating the recording medium device 600 with the content and the title key that are to be recorded into the recording medium device 600. In other words, the MAC generated from the title key and the recording medium device ID is written into the recording medium device 600, and the MAC is verified at the time of playback of the content. In this way, it is possible to judge whether the content has been recorded in the recording medium device 600 in an authorized manner.

The UR transmission unit 412 transmits the UR stored in the title key/UR storage unit 406 to the terminal device 500, in response to a request from the terminal device 500.

<2-9. Operations of Mutual Authentication Processing>

Figure 13:
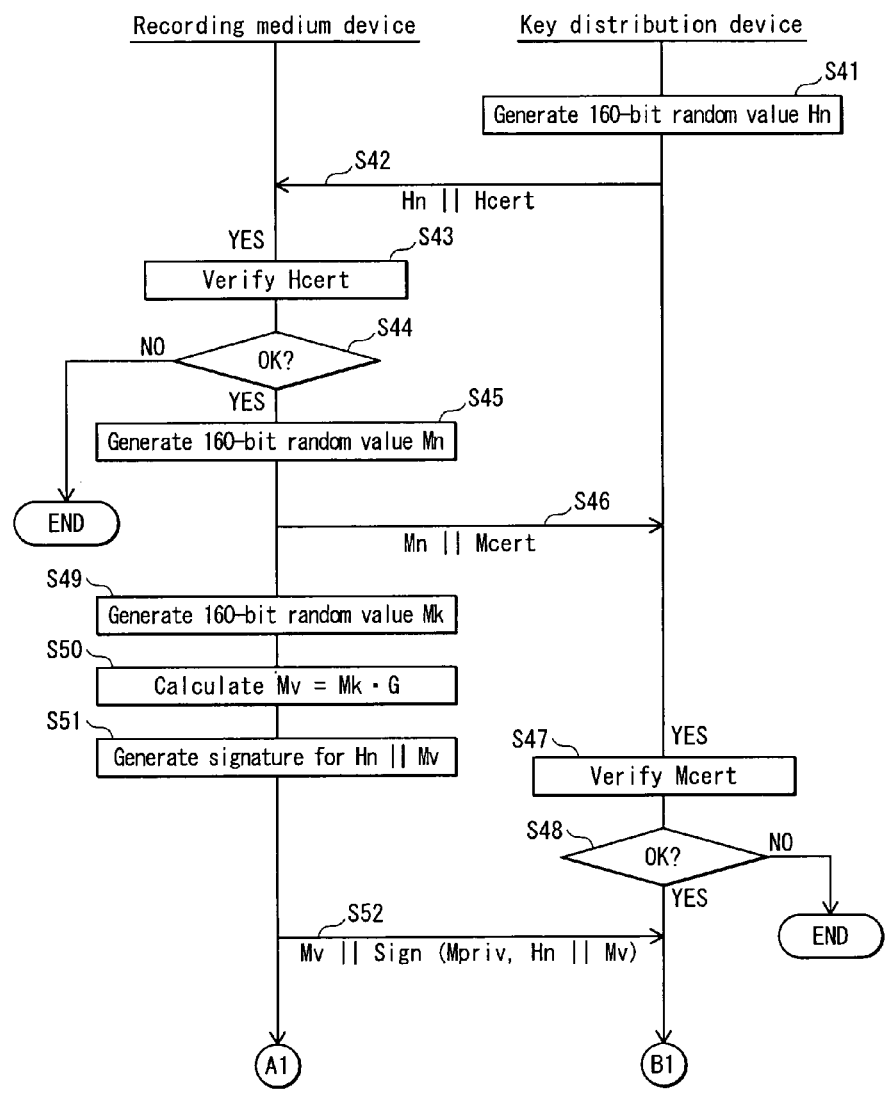
FIG. 13 is a flowchart showing operations of mutual authentication processing.
Figure 14:
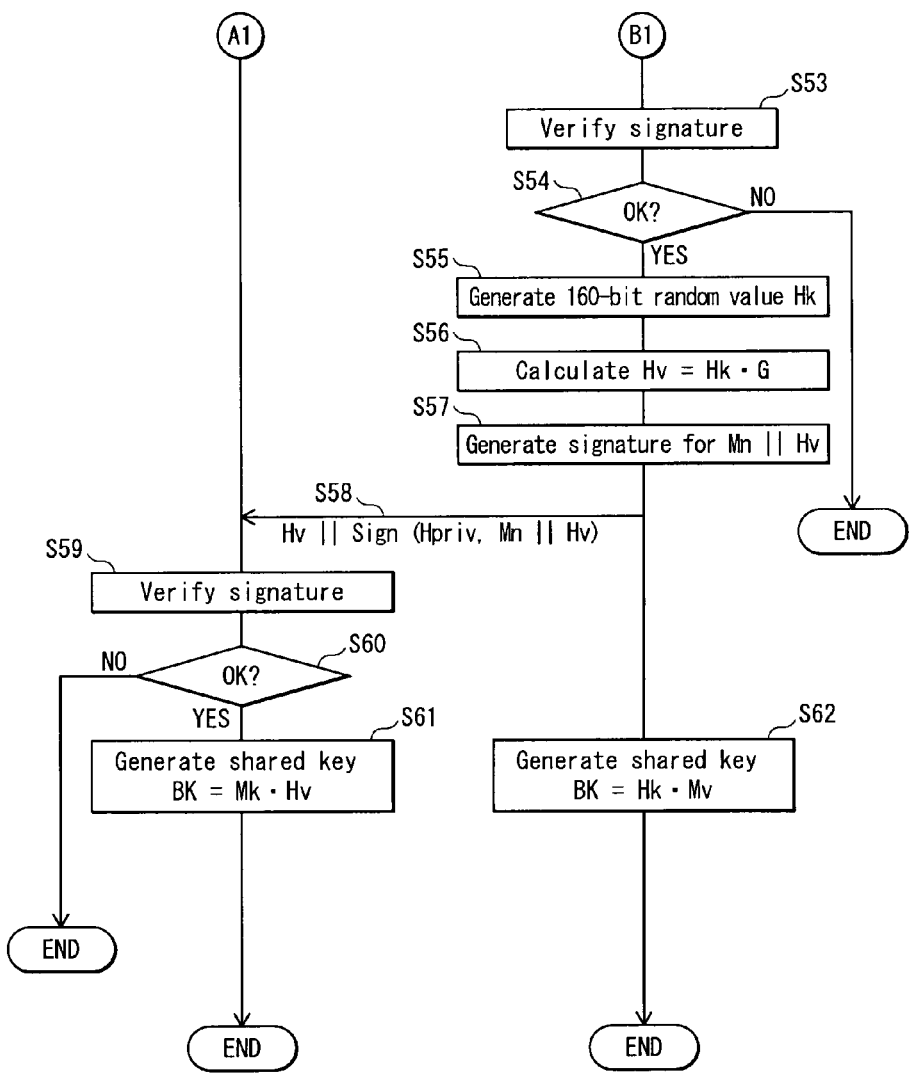
FIG. 14 is a flowchart showing operations of the mutual authentication processing.

The following describes an example of the mutual authentication processing by the mutual authentication unit 408, with reference to the flowcharts of FIGS. 13 and 14. As one example, the mutual authentication processing described here is performed between the key distribution device 400 and the recording medium device 600.

The mutual authentication unit 408 of the key distribution device 400 generates a 160-bit random value Hn (Host nonce) (step S41). In the present example, a 160-bit random value is generated because of the use of the Elliptic Curve-Digital Signature Algorithm (EC-DSA) using a 160-bit key. However, the length of a random value generated here does not need to be 160 bits if another algorithm is used.

The mutual authentication unit 408 concatenates the 160-bit random value Hn generated in step S41 and the key distribution device certificate stored in the private key/certificate storage unit 404. The mutual authentication unit 408 transmits the resultant concatenated data as challenge data to the recording medium device 600 (step S42). In FIG. 13, "Hcert (Host Certificate)" denotes the key distribution device certificate. Also, "||" denotes concatenation of data.

Upon receiving the challenge data from the key distribution device 400, the recording medium device 600 verifies the key distribution device certificate Hcert included in the challenge data received in step S42 with use of the root public key (step S43). If the verification of the key distribution device certificate Hcert fails ("NO" in step S44), the recording medium device 600 ends the mutual authentication processing. If the verification of the key distribution device certificate Hcert is successful ("YES" in step S44), the recording medium device 600 generates a 160-bit random value Mn (Media nonce) (step S45).

The recording medium device 600 concatenates the 160-bit random value Mn generated in step S45 and the recording medium device certificate. The recording medium device 600 transmits the resultant concatenated data as challenge data to the key distribution device 400 (step S46). In FIG. 13, "Mcert (Media Certificate)" denotes the recording medium device certificate.

Upon receiving the challenge data from the recording medium device 600, the key distribution device 400 verifies the recording medium device certificate Mcert included in the challenge data received in step S46 with use of the root public key (step S47). If the verification of the recording medium device certificate Mcert fails ("NO" in step S48), the key distribution device 400 ends the mutual authentication processing. If the verification of the recording medium device certificate Mcert is successful ("YES" in step S48), the mutual authentication unit 408 of the key distribution device 400 proceeds to step S53.

After transmitting the challenge data in step S46, the recording medium device 600 generates a 160-bit random value Mk (Media Key) (step S49). Note that if an algorithm different from the EC-DH is used, the length of the random value generated in step S49 does not need to be 160 bits.

The recording medium device 600 calculates Mx=Mk·G (step S50), where Mk denotes the random value generated in step S49, and G denotes a base point G which is a predetermined parameter of elliptic curve cryptography in the content distribution system according to the present embodiment.

Furthermore, the recording medium device 600 generates a digital signature (Sign(Mpriv, Hn||Mv)) for Hn||Mv, with use of the recording medium device private key (Mpriv) (step S51). Hn||Mv is data obtained by concatenating the value Hn included in the challenge data received in step S42 and the value Mv calculated in step S50.

The recording medium device 600 concatenates the value Mv calculated in step S50 and the digital signature Sign (Mpriv, Hn||Mv) generated in step S51, and transmits the resultant concatenated data to the key distribution device 400 as response data (step S52).

The mutual authentication unit 408 of the key distribution device 400 receives the response data from the recording medium device 600. The mutual authentication unit 408 verifies the digital signature Sign(Mpriv, Hn||Mv) included in the received response data (step S53). Specifically, the mutual authentication unit 408 verifies the digital signature by extracting the value Mv from the response data, concatenating the value Hn generated in step S41 and the value Mv, and using the recording medium device public key included in the recording medium device certificate Mcert with respect to the resultant concatenated data.

If the verification of the digital signature fails ("NO" in step S54), the key distribution device 400 ends the mutual authentication processing. If the verification of the digital signature is successful ("YES" in step S54), the mutual authentication unit 408 generates a 160-bit random value Hk (Host Key) (step S55).

The mutual authentication unit 408 calculates Hv=Hk·G (step S56), where Hk denotes the random value generated in step S55, and G denotes the base point G which is the predetermined parameter of elliptic curve cryptography in the content distribution system according to the present embodiment.

Furthermore, the mutual authentication unit 408 generates a digital signature (Sign(Hpriv, Mn||Hv)) for Mn||Hv, with use of the key distribution device private key (Hpriv) (step S57). Mn||Hv is data obtained by concatenating the value Mn included in the challenge data received in step S46 and the value Hv calculated in step S56.

The mutual authentication unit 408 concatenates the value Hv calculated in step S56 and the digital signature Sign (Hpriv, Mn||Hv) generated in step S57, and transmits the resultant concatenated data to the recording medium device 600 as response data (step S58).

The recording medium device 600 receives the response data from the key distribution device 400. The recording medium device 600 verifies the digital signature Sign(Hpriv, Mn‖Hv) included in the received response data (step S59). Specifically, the recording medium device 600 verifies the digital signature by extracting the value Hv from the response data, concatenating the value Mn generated in step S45 and the value Hv, and using the key distribution device public key included in the public key certificate Hcert of the key distribution device 400 with respect to the resultant concatenated data.

If the verification of the digital signature fails ("NO" in step 60), the recording medium device 600 ends the mutual authentication processing. If the verification of the digital signature is successful ("YES" in step S60), the recording medium device 600 calculates BK=Mk·Hv, where Mk denotes the random value generated in step S49, and Hv denotes the value included in the response data received in step S58, and thereby generates a shared key BK (Bus Key) (step S61).

Meanwhile, the mutual authentication unit 408 of the key distribution device 400 calculates BK=Hk·Mv, where Hk denotes the random value generated in step S55, and Mv denotes the value included in the response data received in step S52, and thereby generates the shared key BK (step S62).

The above processing enables the key distribution device 400 and the recording medium device 600 to check each other's authenticity and to share the shared key BK unknown to the terminal device 500. The key distribution device 400 and the recording medium device 600 establish a secure communication channel (session) using the shared key BK, and securely exchange communication data without letting the terminal device 500 know communication data.

In the present example, a description has been provided of the mutual authentication processing between the key distribution device 400 and the recording medium device 600. However, mutual authentication processing is performed similarly between the key distribution device 400 and the terminal device 500, and between the terminal device 500 and the recording medium device 600. Note that the steps of the mutual authentication processing described above are only an example, and a different method may be used for the mutual authentication processing.

<2-10. Operations of Key Distribution Processing>

Figure 15:
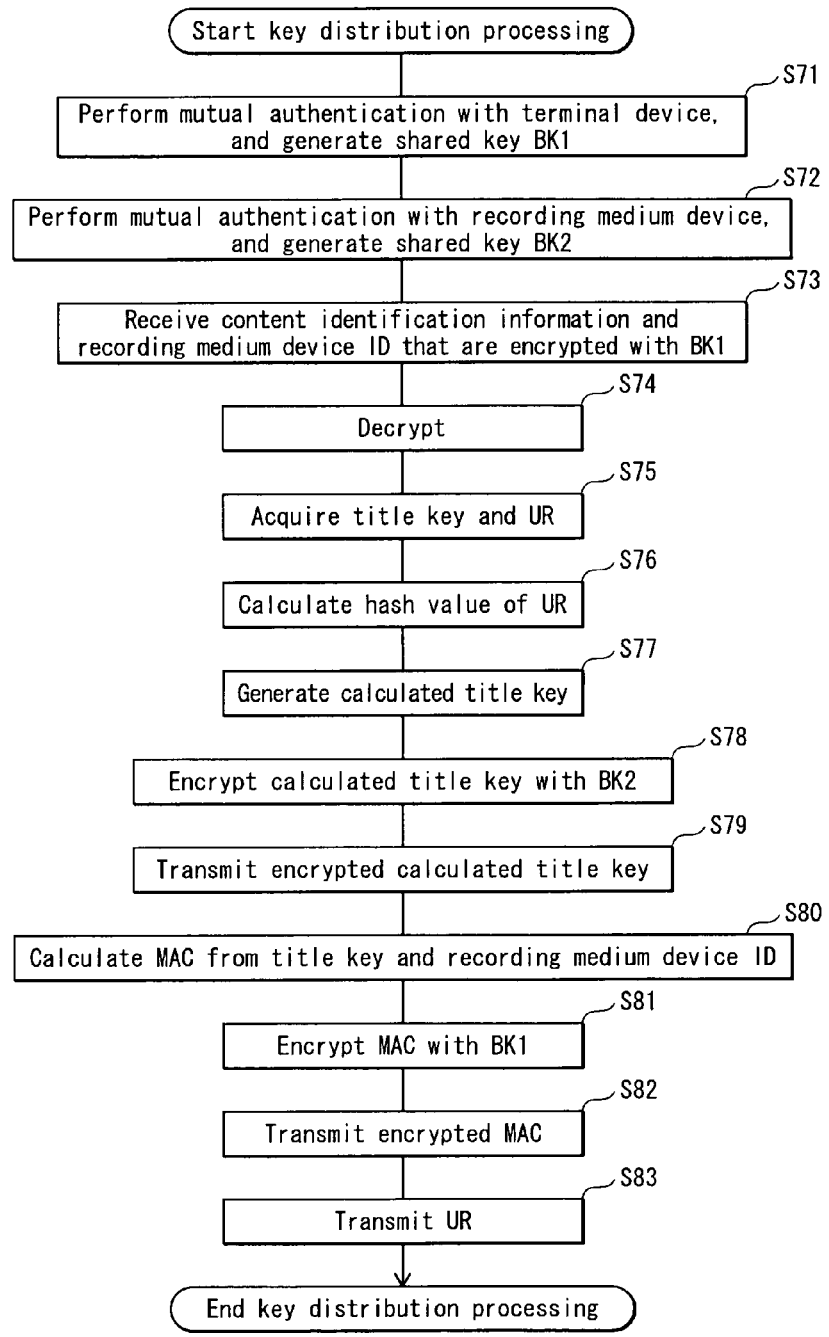
FIG. 15 is a flowchart showing operations of key distribution processing.

FIG. 15 is a flowchart showing operations of the key distribution processing by the key distribution device 400.

Prior to the key distribution processing, the key distribution device 400 receives the root public key from the key issuing device 100 and stores the root public key. Also, the key distribution device 400 receives the key distribution device private key and the key distribution device certificate from the key issuing device 100, and stores therein the key distribution device private key and the key distribution device certificate. Furthermore, the key distribution device 400 receives the title key, the UR, and the content identification information from the content creation device 200, and stores therein the title key, the UR, and the content identification information.

The following processing is performed when the key distribution device 400 receives a request for transmitting a title key from the terminal device 500 or the recording medium device 600.

The mutual authentication unit 408 performs mutual authentication with the terminal device 500, verifies the authenticity of the terminal device 500, and shares a shared key BK1 with the terminal device 500 (step S71). Also, the mutual authentication unit 408 performs mutual authentication with the recording medium device 600, verifies the authenticity of the recording medium device 600, and shares a shared key BK2 with the recording medium device 600 (step S72).

The encryption/decryption unit 409 receives content identification information and a recording medium device ID that are encrypted with the shared key BK1 (step S73), and decrypts the encrypted content identification information and the encrypted recording medium device ID with use of the shared key BK1 (step S74). The encryption/decryption unit 409 transmits the content identification information and the recording medium device ID to the recording medium device ID reception unit 410, and transmits the content identification information to the title key calculation unit 407. Also, the encryption/decryption unit 409 transmits the content identification information to the UR transmission unit 412.

The title key calculation unit 407 acquires the title key and the UR corresponding to the received content identification information from the title key/UR storage unit 406 (step S75). The title key calculation unit 407 calculates a hash value for the UR (step S76). The title key calculation unit 407 performs an exclusive OR (XOR) operation on the hash value of the UR and the title key, and generates a calculated title key (step S77).

The encryption/decryption unit 409 encrypts the calculated title key with use of the shared key BK2 (step S78), and transmits the encrypted calculated title key to the recording medium device 600 (step S79).

Subsequently, the MAC calculation unit 411 receives the recording medium device ID and the content identification information from the recording medium device ID reception unit 410. The MAC calculation unit 411 reads the title key corresponding to the received content identification information from the title key/UR storage unit 406. The MAC calculation unit 411 calculates a MAC from the title key and the recording medium device ID (step S80).

The encryption/decryption unit 409 encrypts the MAC with use of the shared key BK1 (step S81), and transmits the encrypted MAC to the terminal device 500 (step S82).

Next, the UR transmission unit 412 receives the content identification information from the encryption/decryption unit 409, and reads, from the title key/UR storage unit 406, the UR corresponding to the received content identification information. Then, the UR transmission unit 412 transmits the read UR to the terminal device 500 (step S83).

<2-11. Structure of Terminal Device 500>

The terminal device 500 is a PC including: a processor; a ROM; a RAM; a hard disk; a keyboard and a mouse that are input devices; a monitor that is a display device; a card slot for inserting the recording medium device 600 therein; and a network connection unit. A computer program is recorded on the ROM, the RAM, or the hard disk. Some functions of the terminal device 500 are realized by the processor executing the computer program.

The terminal device 500 receives content from the content distribution device 300, via a network such as the Internet or digital broadcasting. Also, the terminal device 500 receives a title key from the key distribution device 400. The terminal device 500 performs content recording processing for recording the content and the title key thus received into the recording medium device 600.

Also, the terminal device 500 performs content playback processing for reading the content from the recording medium device 600 in which the content and the title key are stored, and playing back the content.

Figure 16:
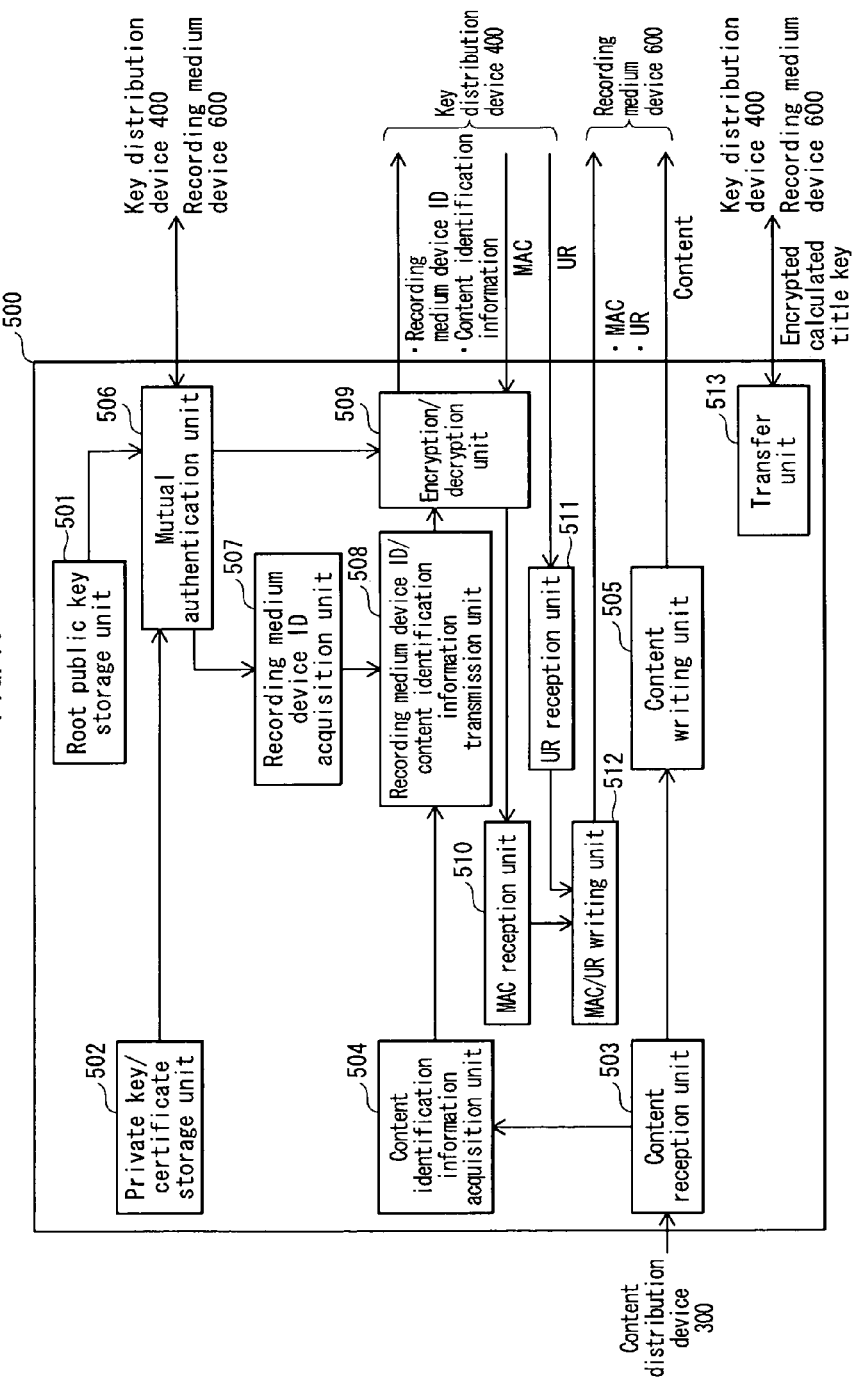
FIG. 16 is a block diagram showing a terminal device 500.
Figure 17:
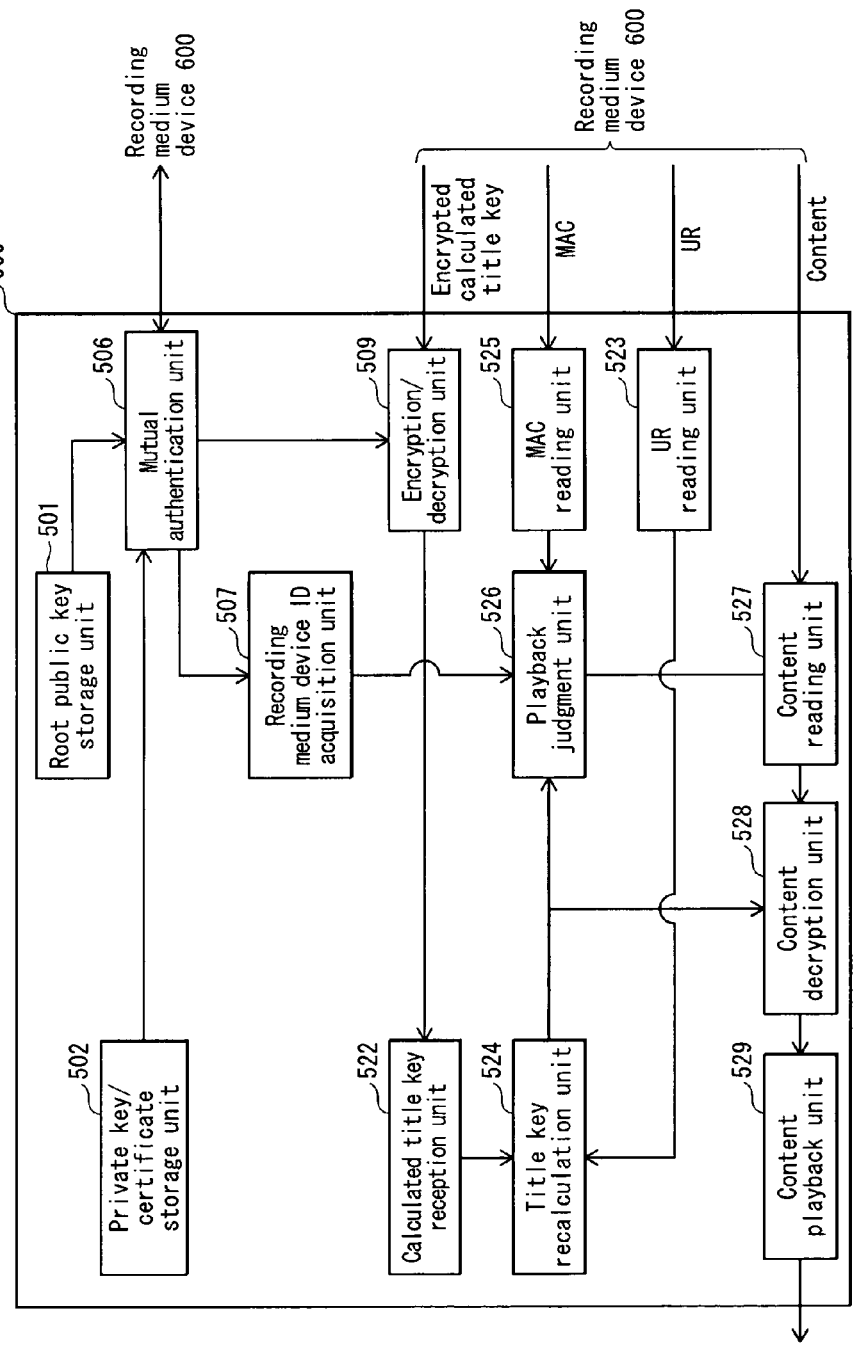
FIG. 17 is a block diagram showing the terminal device 500.

FIGS. 16 and 17 are block diagrams each showing a functional structure of the terminal device 500.

Specifically, FIG. 16 shows a functional structure of the terminal device 500 during the content recording processing. FIG. 17 shows a functional structure of the terminal device 500 during the content playback processing.

As shown in FIGS. 16 and 17, the terminal device 500 includes a root public key storage unit 501, a private key/certificate storage unit 502, a content reception unit 503, a content identification information acquisition unit 504, a content writing unit 505, a mutual authentication unit 506, a recording medium device ID acquisition unit 507, a recording medium device ID/content identification information transmission unit 508, an encryption/decryption unit 509, a MAC reception unit 510, a UR reception unit 511, a MAC/UR writing unit 512, a transfer unit 513, a calculated title key reception unit 522, a UR reading unit 523, a title key recalculation unit 524, a MAC reading unit 525, a playback judgment unit 526, a content reading unit 527, a content decryption unit 528, and a content playback unit 529.

The root public key storage unit 501 stores the root public key generated by the key issuing device 100.

The private key/certificate storage unit 502 stores the terminal device private key and the terminal device certificate generated by the key issuing device 100.

Note that the root public key, the terminal device private key, and the terminal device certificate are embedded in the terminal device 500 by a device that manufactures the terminal device 500, during manufacturing of the terminal device 500.

The content reception unit 503 receives content and content identification information from the content distribution device 300. Note that the content identification information and the content may be received in a state where the content identification information is embedded in the content.

If the content identification information is embedded in the content received by the content reception unit 503, the content identification information acquisition unit 504 may extract the content identification information from the content so as to acquire the content identification information.

The content writing unit 505 writes the content received by the content reception unit 503 into the recording medium device 600.

The mutual authentication unit 506 performs mutual authentication with the key distribution device 400, verifies the authenticity of the key distribution device 400, and shares a shared key with the key distribution device 400. Also, the mutual authentication unit 506 performs mutual authentication with the recording medium device 600, verifies the authenticity of the recording medium device 600, and shares a shared key with the recording medium device 600. The mutual authentication processing is described above with reference to FIGS. 13 and 14; therefore, a description thereof is omitted here.

The recording medium device ID acquisition unit 507 acquires the recording medium device ID from the recording medium device certificate received during the mutual authentication processing performed by the mutual authentication unit 506.

The recording medium device ID/content identification information transmission unit 508 acquires the content identification information from either the content reception unit 503 or the content identification information acquisition unit 504. Also, the recording medium device ID/content identification information transmission unit 508 acquires the recording medium device ID from the recording medium device ID acquisition unit 507. After acquiring both the recording medium device ID and the content identification information, the recording medium device ID/content identification information transmission unit 508 pairs the recording medium device ID with the content identification information, and transmits the pair to the key distribution device 400 via the encryption/decryption unit 509.

The encryption/decryption unit 509 encrypts and decrypts data exchanged with the key distribution device 400, with use of the shared key shared with the key distribution device 400. Similarly, the encryption/decryption unit 509 encrypts and decrypts data exchanged with the recording medium device 600, with use of the shared key shared with the recording medium device 600.

The MAC reception unit 510 receives a MAC from the key distribution device 400 via the encryption/decryption unit 509. The MAC received by the MAC reception unit 510 is a MAC calculated from (i) the title key used to encrypt the content written by the content writing unit 505 into the recording medium device 600 and (ii) the recording medium device ID transmitted by the recording medium device ID/content identification information transmission unit 508 to the key distribution device 400.

The UR reception unit 511 receives, from the key distribution device 400, the UR corresponding to the content identified by the content identification information transmitted by the recording medium device ID/content identification information transmission unit 508 to the key distribution device 400. The UR reception unit 511 receives the UR without the intervention of the encryption/decryption unit 509 (i.e., the UR not being encrypted or decrypted by the encryption/decryption unit 509).

The MAC/UR writing unit 512 writes the MAC received by the MAC reception unit 510 and the UR received by the UR reception unit 511 into the recording medium device 600.

The transfer unit 513 transfers communication data exchanged between the key distribution device 400 and the recording medium device 600. In other words, after the session is established between the key distribution device 400 and the recording medium device 600 through the mutual authentication processing, the transfer unit 513 simply transfers communication data transmitted via the session without verifying or modifying the data, except for control data indicating information such as the start and end of communication.

Specifically, the transfer unit 513 receives, from the key distribution device 400, an encrypted calculated title key generated by encrypting a calculated title key with use of the shared key shared between the key distribution device 400 and the recording medium device 600 through the mutual authentication processing. Then, the transfer unit 513 transmits the encrypted calculated title key thus received to the recording medium device 600. Because of not knowing the value of the shared key shared between the key distribution device 400 and the recording medium device 600, the terminal device 500 cannot decrypt the encrypted calculated title key.

During the content playback processing, the calculated title key reception unit 522 receives, from the recording medium device 600 via the encryption/decryption unit 509, a calculated title key generated from a title key used to encrypt the content to be played back.

The UR reading unit 523 reads, from the recording medium device 600, the UR corresponding to the content to be played back.

The title key recalculation unit 524 calculates a hash value for the UR read by the UR reading unit 523. Then, the title key recalculation unit 524 calculates the original title key by performing an XOR operation on the calculated title key received by the calculated title key reception unit 522 and the hash value of the UR.

The MAC reading unit 525 reads, from the recording medium device 600, the MAC corresponding to the content to be played back.

The playback judgment unit 526 calculates a MAC from the title key generated by the title key recalculation unit 524 and the recording medium device ID acquired by the recording medium device ID acquisition unit 507. Then, the playback judgment unit 526 judges whether the calculated MAC matches the MAC read by the MAC reading unit 525 from the recording medium device 600.

If the MACs match, it is verified that the content to be played back and the title key corresponding to the content have been recorded in the recording medium device 600 in an authorized manner. Accordingly, the playback judgment unit 526 judges that playback of the content is permitted. Then, the playback judgment unit 526 instructs the content reading unit 527 to read the content.

If the MACs do not match, there is a possibility that the content to be played back and the title key corresponding to the content are copied into the recording medium device 600 in an unauthorized manner. Accordingly, the playback judgment unit 526 judges that playback of the content is not permitted, and displays on the display device that playback of the content is not permitted.

Upon being instructed by the playback judgment unit 526 to read the content, the content reading unit 527 reads the content to be played back from the recording medium device 600.

The content decryption unit 528 decrypts the content by applying a decryption algorithm D1 to the content read by the content reading unit 527 with use of the title key generated by the title key recalculation unit 524. The decryption algorithm D1 is an algorithm for decrypting the ciphertext generated with use of the encryption algorithm E1 into plaintext.

The content playback unit 529 decodes the decrypted content, and outputs the decoded content to the display device.

<2-12. Operations of Content Recording Processing>

Figure 18:
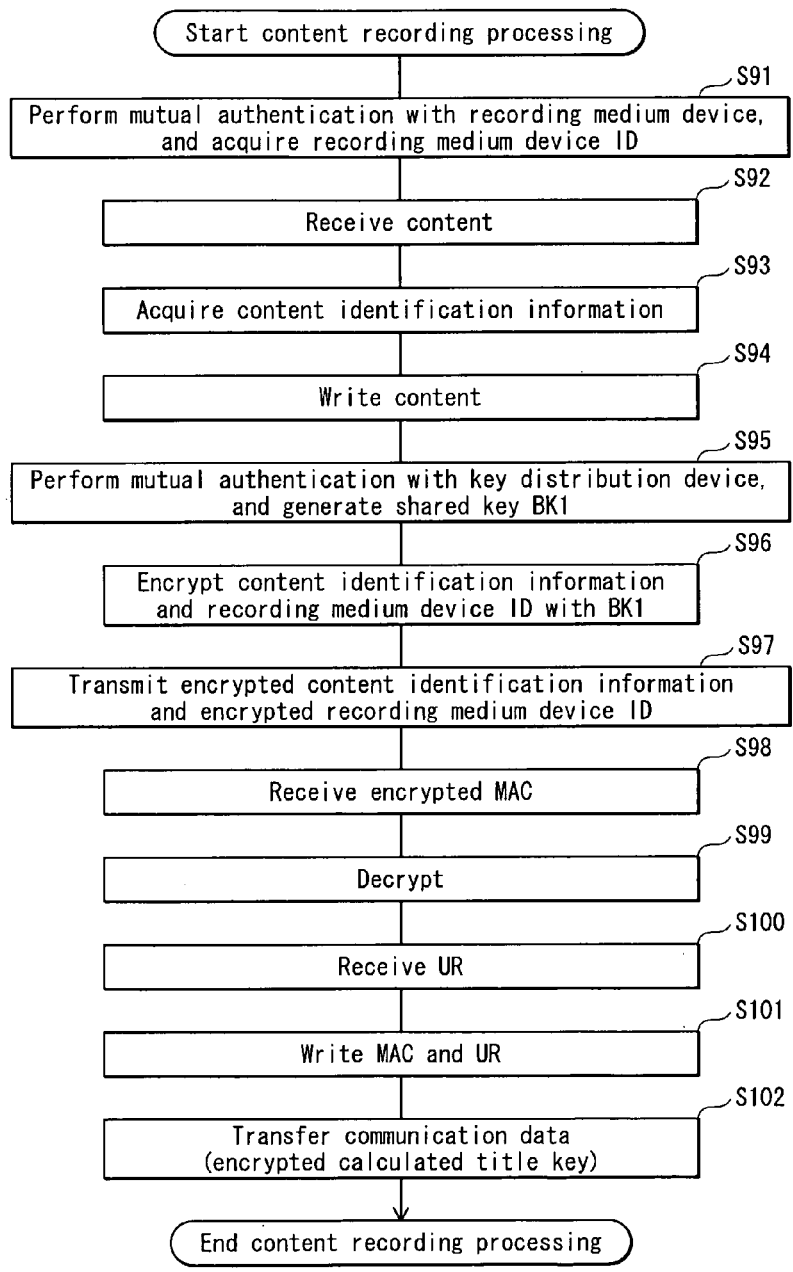
FIG. 18 is a flowchart showing operations of content recording processing.

FIG. 18 is a flowchart showing operations of the content recording processing by the terminal device 500.

Note that the terminal device 500 stores in advance the root public key, the terminal device private key, and the terminal device certificate.

The mutual authentication unit 506 performs mutual authentication with the recording medium device 600, and verifies the authenticity of the recording medium device 600. The recording medium device ID acquisition unit 507 acquires the recording medium device ID from the recording medium device certificate received during the mutual authentication processing (step S91).

The content reception unit 503 receives content from the content distribution device 300 (step S92). The content identification information acquisition unit 504 analyses the content. If content identification information is embedded in the content, the content identification information acquisition unit 504 acquires the content identification information from the content (step S93). The content writing unit 505 writes the content received in step S92 into the recording medium device 600 (step S94).

Subsequently, the mutual authentication unit 506 performs mutual authentication with the key distribution device 400, verifies the authenticity of the key distribution device 400, and shares the shared key BK1 with the key distribution device 400 (step S95). The encryption/decryption unit 509 encrypts the recording medium device ID acquired in step S91 and the content identification information acquired in step S93, with use of the shared key BK1 (step S96). The encryption/decryption unit 509 transmits the recording medium device ID and the content identification information encrypted with use of the shared key BK1 to the key distribution device 400 (step S97).

Next, the encryption/decryption unit 509 receives a MAC encrypted with the shared key BK1 from the key distribution device 400 (step S98). The encryption/decryption unit 509 decrypts the encrypted MAC with use of the shared key BK1 (step S99), and transmits the decrypted MAC to the MAC reception unit 510. The UR reception unit 511 receives a UR from the key distribution device 400 (step S100).

Next, the MAC/UR writing unit 512 writes the MAC and the UR into the recording medium device 600 (step S101).

Next, the transfer unit 513 transfers communication data exchanged on the session between the key distribution device 400 and the recording medium device 600 (step S102). The communication data transferred as described above is an encrypted calculated title key which is a calculated title key encrypted with a shared key unknown to the terminal device 500.

<2-13 Operations of Content Playback Processing>

Figure 19:
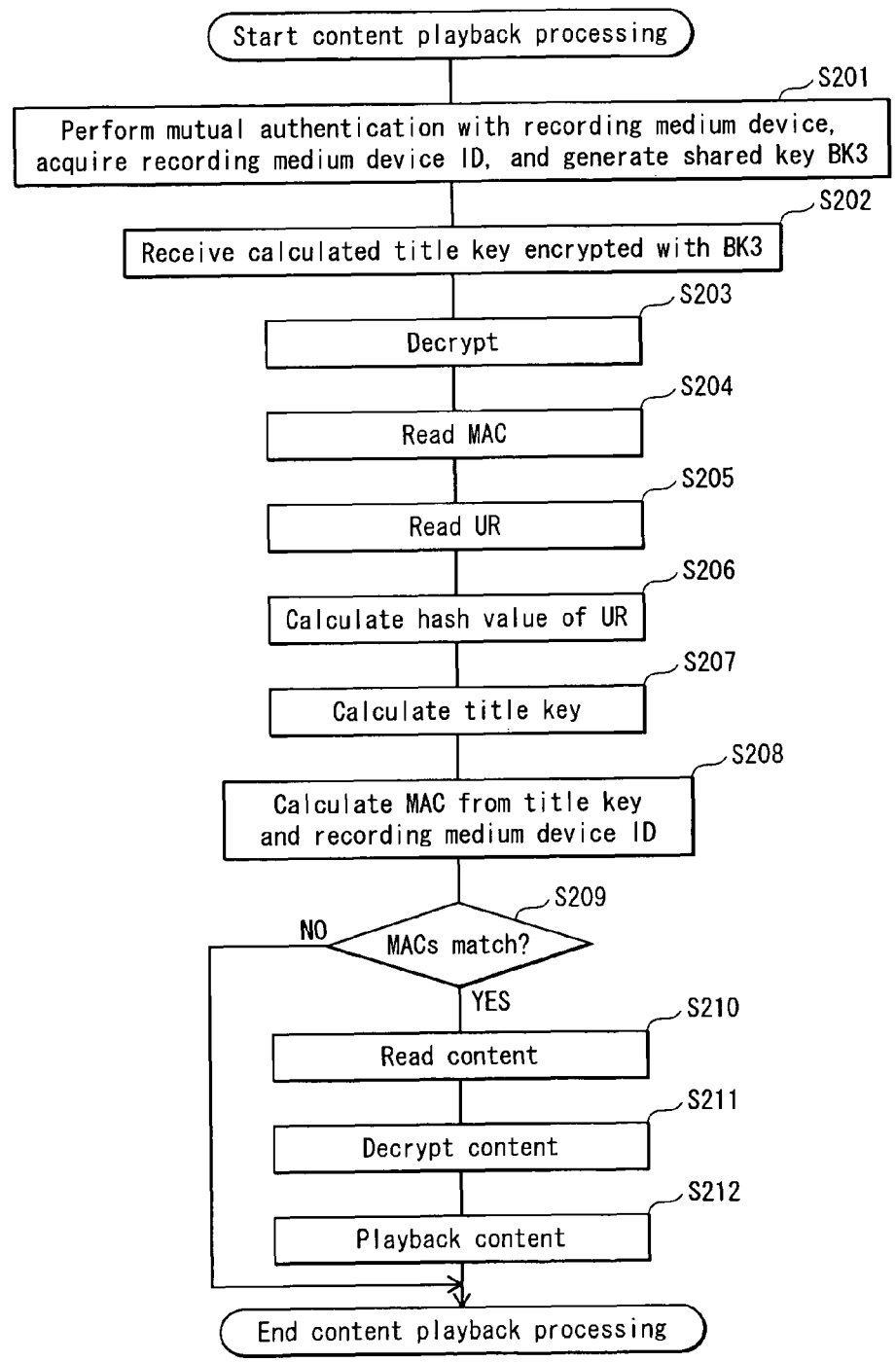
FIG. 19 is a flowchart showing operations of content playback processing.

FIG. 19 is a flowchart showing operations of the content playback processing by the terminal device 500. Hereinafter, it is assumed that the recording medium device 600 has already stored therein the content, the calculated title key, the MAC, the UR, etc., through the content recording processing described above.

The mutual authentication unit 506 performs mutual authentication processing with the recording medium device 600, and generates a shared key BK3. The recording medium device ID acquisition unit 507 acquires the recording medium device ID from the recording medium device certificate received during the mutual authentication processing (step S201). The recording medium device ID acquisition unit 507 transmits the recording medium device ID thus acquired to the playback judgment unit 516.

Subsequently, the encryption/decryption unit 509 receives, from the recording medium device 600, the calculated title key encrypted with the shared key BK3 (step S202), and decrypts the encrypted calculated title key with the shared key BK3 (step S203). The encryption/decryption unit 509 transmits the calculated title key thus decrypted to the calculated title key reception unit 522. The calculated title key reception unit 522 receives the calculated title key, and transmits the calculated title key to the title key recalculation unit 524.

Next, the MAC reading unit 525 reads the MAC from the recording medium device 600 (step S204), and transmits the MAC to the playback judgment unit 526. The UR reading unit 523 reads the UR from the recording medium device 600 (step S205), and transmits the UR to the title key recalculation unit 524.

The title key recalculation unit 524 calculates a hash value for the UR (step S206). Then, the title key recalculation unit 524 performs an exclusive OR (XOR) operation on the hash value of the UR and the calculated title key, and calculates the original title key (step S207). The title key recalculation unit 524 transmits the title key thus calculated to the playback judgment unit 526 and the content decryption unit 528.

Subsequently, the playback judgment unit 526 calculates a MAC from the title key and the recording medium device ID (step S208). Then, the playback judgment unit 526 judges whether the MAC calculated in step S208 matches the MAC read from the recording medium device 600 in step S204.

If the MACs do not match ("NO" in step S209), the content playback processing is ended. If the MACs match (YES in step S209), the content reading unit 527 reads the content from the recording medium device 600 (step S210). The content decryption unit 528 decrypts the content with use of the title key (step S211), and the content playback unit 529 decodes the content and outputs the decoded content to the display device (step S212).

<2-14. Structure of Recording Medium Device 600>

The recording medium device 600 is an SD memory card used by being inserted into the terminal device 500.

Figure 20:
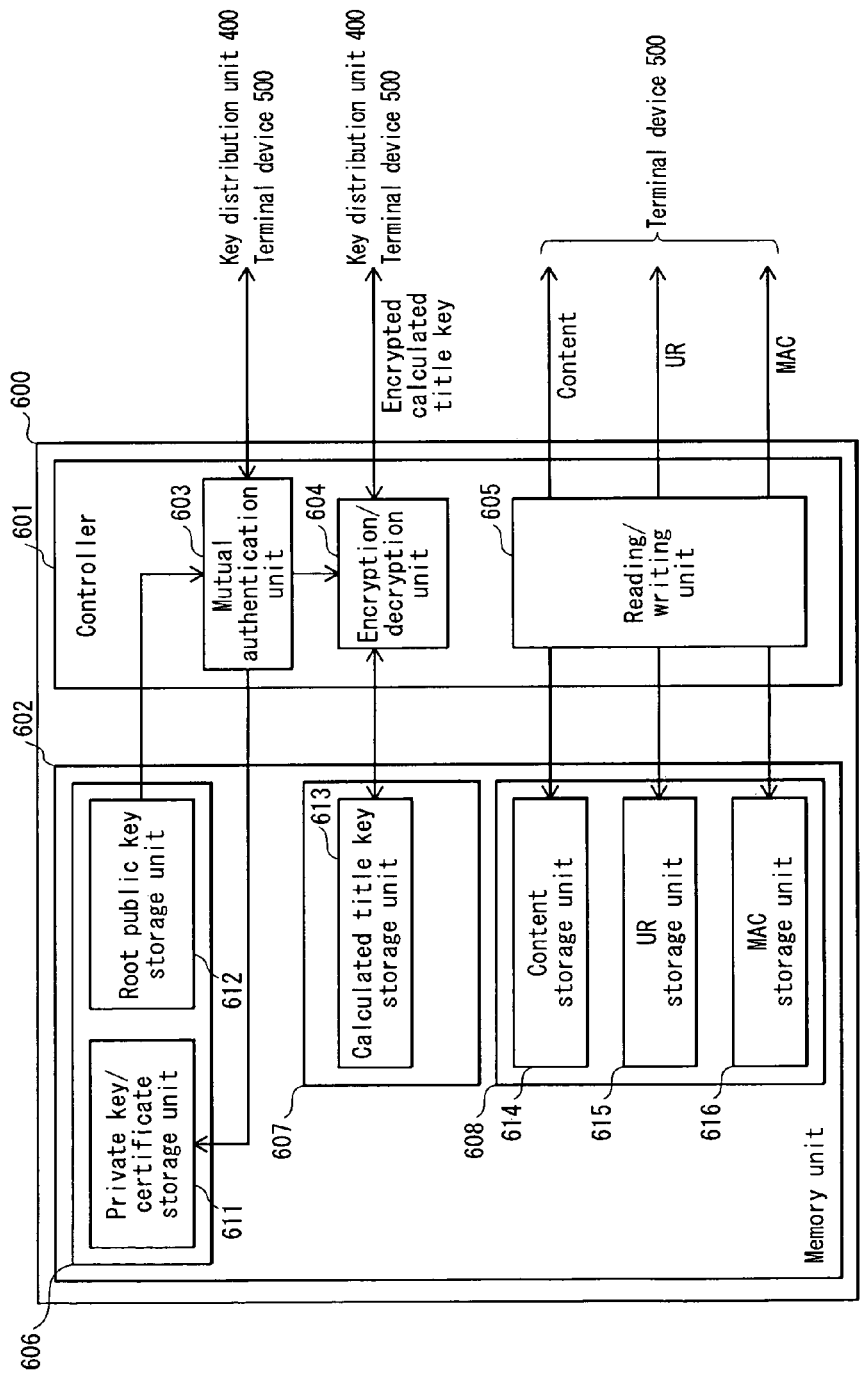
FIG. 20 is a block diagram showing a recording medium device 600.

FIG. 20 is a block diagram showing the functional structure of the recording medium device 600.

As shown in FIG. 20, the recording medium device 600 includes a controller 601 and a memory unit 602.

The controller 601 is an LSI device manufactured by a controller manufacturer. The internal processing by the controller 601 is securely protected, so that information stored in the controller 601 cannot be read by an external device.

The memory unit 602 is a flash memory manufactured by a flash memory manufacturer. Writing of data to the memory unit 602 and reading of data from the memory unit 602 are performed via the controller 601. Specifically, the memory unit 602 includes a system region 606, an authorized region 607 and a regular region 608. The system region 606 is accessible only by the controller 601 (i.e., only the controller 601 is permitted to read data from the system region 706 and write data to the system region 706), and not accessible by a device external to the controller 601. Accessing the authorized region 607 requires authentication processing via the controller 601. The regular region 608 does not need authentication processing and is freely accessible by an external device via the controller 601.

The controller 601 includes a mutual authentication unit 603, an encryption/decryption unit 604, and a reading/writing unit 605.

The mutual authentication unit 603 performs mutual authentication with the key distribution device 400, and shares a shared key. Also, the mutual authentication unit 603 performs mutual authentication with the terminal device 500, and shares a shared key. The mutual authentication processing and key sharing processing are described above with reference to FIGS. 13 and 14; therefore, descriptions thereof are omitted here.

The encryption/decryption unit 604 encrypts and decrypts data exchanged with the key distribution device 400, with use of the shared key shared with the key distribution device 400. Similarly, the encryption/decryption unit 604 encrypts and decrypts data exchanged with the terminal device 500, with use of the shared key shared with the terminal device 500.

Specifically, during recording of content, the encryption/decryption unit 604 receives, via the transfer unit 513 of the terminal device 500, the encrypted calculated title key transmitted from the key distribution device 400. The encryption/decryption unit 604 decrypts the encrypted calculated title key thus received, and writes the decrypted calculated title key into the memory unit 602.

Also, during playback of the content, the encryption/decryption unit 604 reads the calculated title key stored in the memory unit 602, encrypts the calculated title key, and transmits the encrypted calculated title key to the terminal device 500.

The reading/writing unit 605 reads data from the regular region 608, and writes data to the regular region 608.

The system region 606 includes a private key/certificate storage unit 611 and a root public key storage unit 612.

The private key/certificate storage unit 611 stores the recording medium device private key and the recording medium device certificate generated by the key issuing device 100.

The root public key storage unit 612 stores the root public key generated by the key issuing device 100.

Note that the root public key, the recording medium device private key, and the recording medium device certificate are embedded in the memory unit 602 by a device that manufactures the recording medium device 600, during manufacturing of the recording medium device 600.

The authorized region 607 includes a calculated title key storage unit 613 that stores the calculated title key. As described above, accessing the authorized region 607 requires authentication processing via the controller 601. Accordingly, writing and reading of the calculated title key is always performed via the mutual authentication unit 603 and the encryption/decryption unit 604.

The content storage unit 614 stores content. The MAC storage unit 615 stores a UR. The MAC storage unit 616 stores a MAC.

The content, the UR, and the MAC are received by the reading/writing unit 605 from the terminal device 500 during recording of the content, and are written by the reading/writing unit 605 into the content storage unit 614, the UR storage unit 615, and the MAC storage unit 616, respectively.

Also, in response to a read request from the terminal device 500 during playback of the content, the content, the UR, and the MAC are read by the reading/writing unit 605 from the content storage unit 614, the UR storage unit 615, and the MAC storage unit 616, respectively. The content, the UR, and the MAC are then transmitted to the terminal device 500.

<2-15. Operations of Title Key Acquisition Processing>

Figure 21:
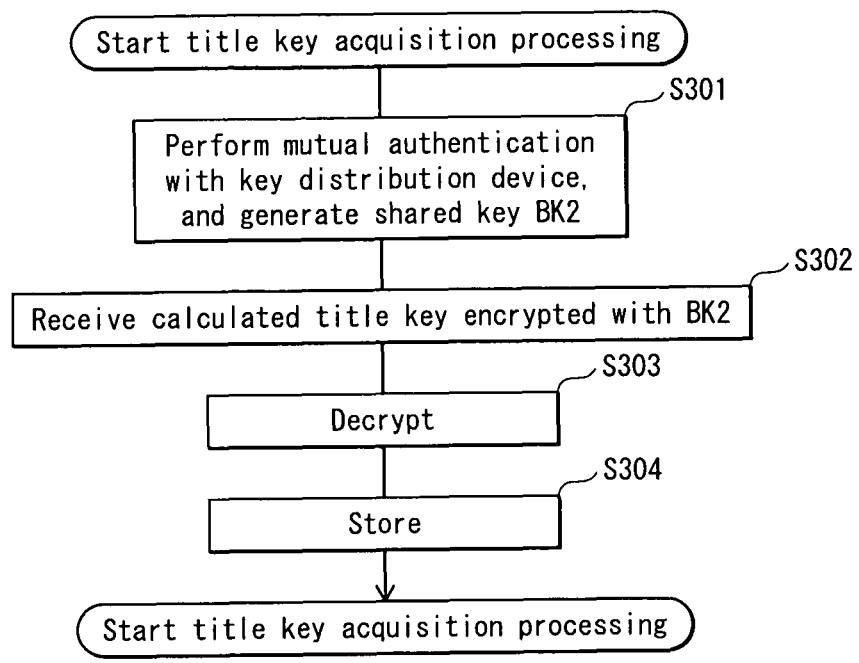
FIG. 21 is a flowchart showing operations of title key acquisition processing.

FIG. 21 is a flowchart showing the operations of title key acquisition processing by the recording medium device 600.

Note that the recording medium device 600 stores in advance the root public key, the recording medium device private key, and the recording medium device certificate.

The mutual authentication unit 603 performs mutual authentication processing with the key distribution device 400, and shares the shared key BK2 with the key distribution device 400 (step S301).

The encryption/decryption unit 604 receives the calculated title key encrypted with the shared key BK2, from the key distribution device 400 via the terminal device 500 (step S302). The encryption/decryption unit 604 decrypts the encrypted calculated title key with use of the shared key BK2 generated in step S301 (step S303). Next, the calculated title key storage unit 613 stores the decrypted calculated title key (step S304).

<3. Embodiment 2>

The following describes a content distribution system 2 as another aspect of the present invention.

<3-1. Outline>

Figure 22:
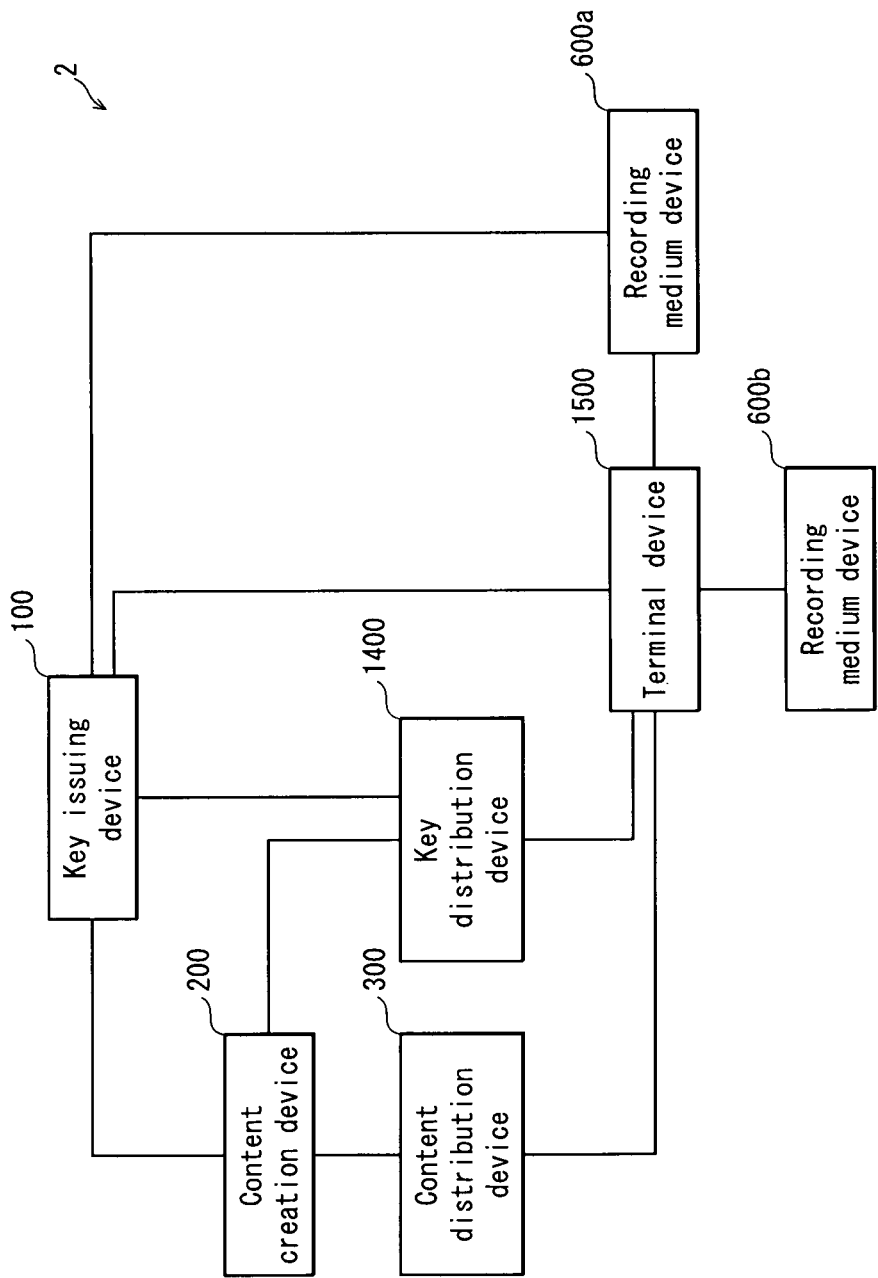
FIG. 22 shows the structure of a content distribution system 2.

FIG. 22 shows the overall structure of the content distribution system 2.

The content distribution system 2 includes a key issuing device 100, a content creation device 200, a content distribution device 300, a key distribution device 1400, a terminal device 1500, and recording medium devices 600a and 600b.

The key issuing device 100, the content creation device 200, the content distribution device 300, and the recording medium devices 600a and 600b respectively have the same structure and functions as the key issuing device 100, the content creation device 200, the content distribution device 300, and the recording medium device 600 in Embodiment 1.

The content distribution system 2 according to Embodiment 2 is a system for transferring the content and the title key stored in the recording medium device 600a to the recording medium device 600b.

The following mainly describes the differences from Embodiment 1, and detailed descriptions of the key issuing device 100, the content creation device 200, the content distribution device 300, and the recording medium devices 600a and 600b are omitted.

<3-2. Structure of Key Distribution Device 1400>

The key distribution device 1400 is a computer system including a processor, a ROM, a RAM, and a hard disk. The key distribution device 1400 performs title key transfer processing for transferring a title key used for decryption of content, from the recording medium device 600a to the recording medium device 600b.

Figure 23:
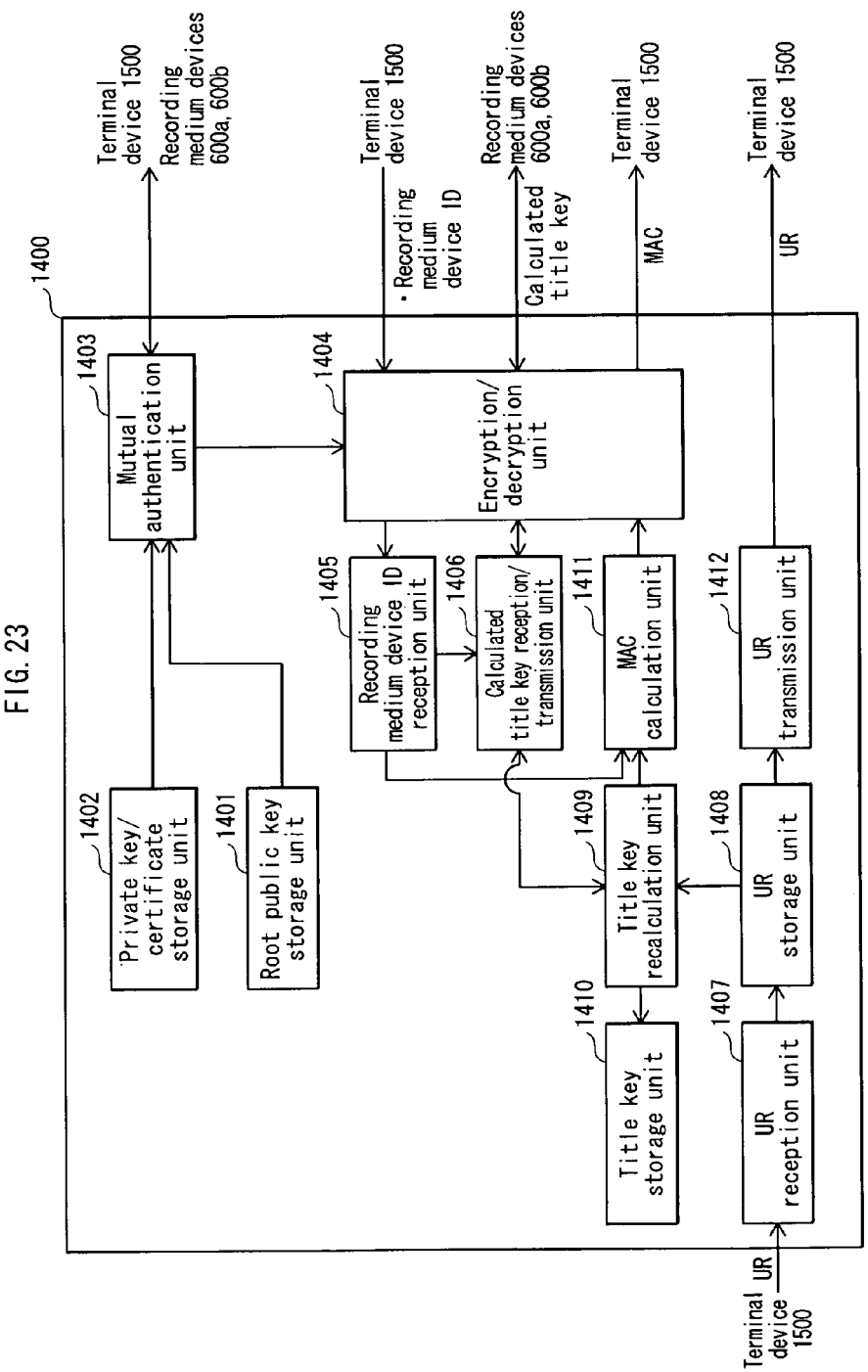
FIG. 23 is a block diagram showing a key distribution device 1400.

FIG. 23 is a block diagram showing the functional structure of the key distribution device 1400.

As shown in FIG. 23, the key distribution device 1400 includes a root public key storage unit 1401, a private key/certificate storage unit 1402, a mutual authentication unit 1403, an encryption/decryption unit 1404, a recording medium device ID reception unit 1405, a calculated title key reception/transmission unit 1406, a UR reception unit 1407, a UR storage unit 1408, a title key recalculation unit 1409, a title key storage unit 1410, a MAC calculation unit 1411, and a UR transmission unit 1412.

The root public key storage unit 1401 stores a root public key generated by the key issuing device 100.

The private key/certificate storage unit 1402 stores a key issuing device private key and a key issuing device certificate generated by the key issuing device 100.

The mutual authentication unit 1403 performs mutual authentication with the terminal device 1500, and shares a shared key with the terminal device 1500. Also, the mutual authentication unit 1403 performs mutual authentication with the recording medium device 600a, and shares a shared key with the recording medium device 600a. Furthermore, the mutual authentication unit 1403 performs mutual authentication with the recording medium device 600b, and shares a shared key with the recording medium device 600b.

The encryption/decryption unit 1404 uses the shared key shared with the terminal device 1500 to encrypt and decrypt data exchanged with the terminal device 1500. Also, the encryption/decryption unit 1404 encrypts and decrypts data exchanged with the recording medium device 600a, with use of the shared key shared with the recording medium device 600a. Similarly, the encryption/decryption unit 1404 encrypts and decrypts data exchanged with the recording medium device 600b, with use of the shared key shared with the recording medium device 600b.

The recording medium device ID reception unit 1405 receives, from the terminal device 1500 via the encryption/decryption unit 1404, (i) a recording medium device ID (hereinafter "transmission recording medium device ID") of the recording medium device 600a that is a transmitter of content and (ii) a recording medium device ID (hereinafter "reception recording medium device ID") of the recording medium device 600b that is a receiver of the content.

The calculated title key reception/transmission unit 1406 receives a calculated title key from the recording medium device 600a via the encryption/decryption unit 1404. Also, the calculated title key reception/transmission unit 1406 transmits the calculated title key to the recording medium device 600b via the encryption/decryption unit 1404. If the recording medium device 600b cannot receive the calculated title key for some reason, such as a breakdown of the recording medium device 600b, the calculated title key reception/transmission unit 1406 returns the calculated title key to the recording medium device 600a via the encryption/decryption unit 1404.

The UR reception unit 1407 receives a UR from the terminal device 1500.

The UR storage unit 1408 stores the UR received by the UR reception unit 1407.

The title key recalculation unit 1409 acquires the UR from the UR storage unit 1408, and acquires the calculated title key received by the calculated title key reception/transmission unit 1406 from the recording medium device 600a via the encryption/decryption unit 1404. The title key recalculation unit 1409 calculates a hash value for the UR. Then, the title key recalculation unit 1409 calculates the original title key by performing an exclusive OR (XOR) operation on the hash value of the UR and the calculated title key.

The title key storage unit 1410 stores the title key calculated by the title key recalculation unit 1409.

The MAC calculation unit 1411 calculates a MAC from the title key stored in the title key storage unit 1410 and the reception recording medium device ID received by the recording medium device ID reception unit 1405. Then, the MAC calculation unit 1411 transmits the MAC to the terminal device 1500 via the encryption/decryption unit 1404. If the recording medium device 600b cannot receive the MAC from the terminal device 1500 for some reason, such as a breakdown of the recording medium device 600b, the MAC calculation unit 1411 calculates a MAC from the title key and the transmission recording medium device ID. Then, the MAC calculation unit 1411 transmits the MAC to the terminal device 1500 via the encryption/decryption unit 1404.

The UR transmission unit 1412 transmits the UR stored in the UR storage unit 1408 to the terminal device 1500.

<3-3. Operations of Title Key Transfer Processing>

Figure 24:
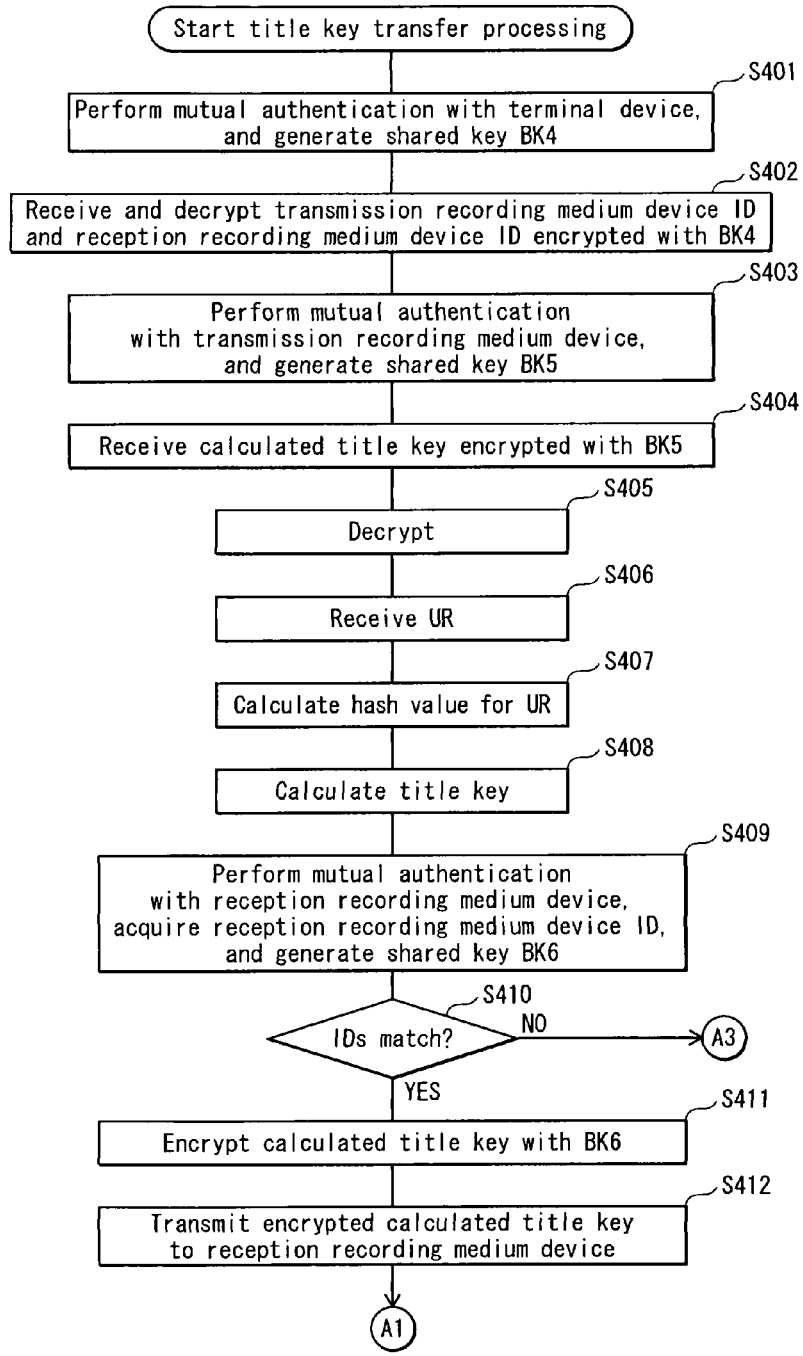
FIG. 24 is a flowchart showing operations of title key transfer processing.
Figure 25:
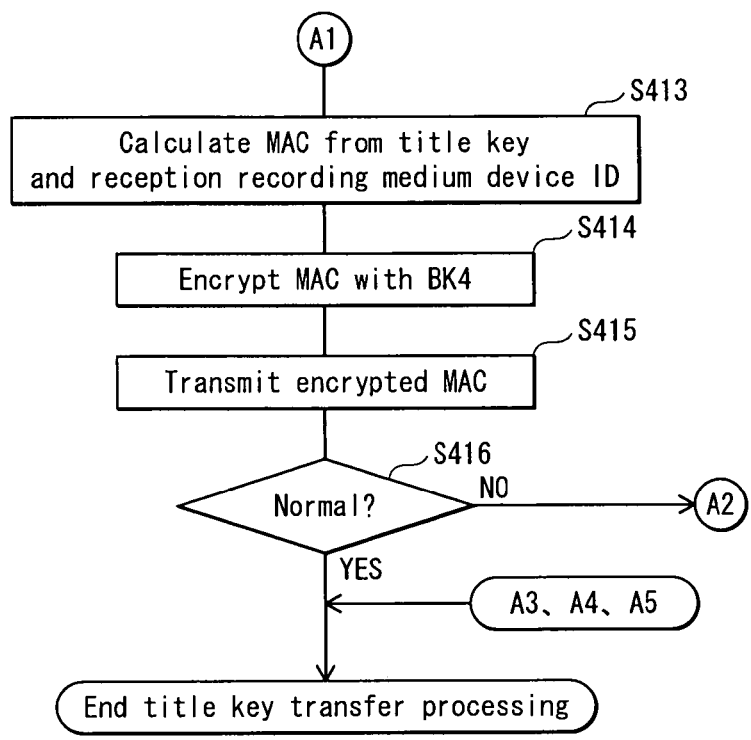
FIG. 25 is a flowchart showing operations of the title key transfer processing.

FIGS. 24 and 25 are flowcharts each showing operations of title key transfer processing by the key distribution device 1400.

Note that the key distribution device 1400 stores in advance the root public key, the key distribution device private key, and the key distribution device certificate.

The mutual authentication unit 1403 performs mutual authentication with the terminal device 1500, verifies the authenticity of the terminal device 1500, and shares a shared key BK4 with the terminal device 1500 (step S401).

The encryption/decryption unit 1404 receives, from the terminal device 1500, the transmission recording medium device ID and the reception recording medium device ID that are encrypted with the shared key BK4. Next, the encryption/decryption unit 1404 decrypts these recording medium device IDs with use of the shared key BK4 (step S402).

The mutual authentication unit 1403 performs mutual authentication with the recording medium device 600a, verifies the authenticity of the recording medium device 600a, and shares a shared key BK5 with the recording medium device 600a (step S403).

The encryption/decryption unit 1404 receives, from the recording medium device 600a, the calculated title key encrypted with the shared key BK5 (step S404). The encryption/decryption unit 1404 decrypts the encrypted calculated title key with use of the shared key BK5 (step S405), and transmits the decrypted calculated title key to the calculated title key reception/transmission unit 1406.

Next, the UR reception unit 1407 receives, from the terminal device 1500, the UR stored in the recording medium device 600a (step S406). The UR reception unit 1407 stores the received UR into the UR storage unit 1408.

The title key recalculation unit 1409 acquires the UR from the UR storage unit 1408, and calculates a hash value for the UR (step S407). Next, the title key recalculation unit 1409 performs an exclusive OR (XOR) operation on the hash value of the UR and the calculated title key received by the calculated title key reception/transmission unit 1406 from the recording medium device 600a, and calculates the original title key (step S408). The title key recalculation unit 1409 stores the title key thus calculated into the title key storage unit 1410.

Through the above processing, the title key and other data necessary for playback of the content are securely backed up from the recording medium device 600a to the key distribution device 1400.

Subsequently, the mutual authentication unit 1403 performs mutual authentication with the recording medium device 600b, and verifies the authenticity of the recording medium device 600b. Furthermore, the mutual authentication unit 1403 acquires the reception recording medium device ID from the recording medium device certificate of the recording medium device 600b. Also, the mutual authentication unit 1403 shares a shared key BK6 with the recording medium device 600b (step S409).

The mutual authentication unit 1403 judges whether the reception recording medium device ID acquired in step S409 matches the reception recording medium device ID received in step S402.

If the IDs do not match (NO in step S410), the key distribution device 1400 ends the title key transfer processing.

If the IDs match, (YES in step S410), the encryption/decryption unit 1404 acquires the calculated title key from the calculated title key reception/transmission unit 1406, and encrypts the calculated title key with the shared key BK6 shared with the recording medium device 600b (step S411). Then, the encryption/decryption unit 1404 transmits the encrypted calculated title key to the recording medium device 600b (step S412).

Next, the MAC calculation unit 1411 calculates a MAC from the title key stored in the title key storage unit 1410 and the reception recording medium device ID received in step S402 (step S413). The encryption/decryption unit 1404 encrypts the MAC calculated in step S413 with use of the shared key BK4 shared with the terminal device 1500 (step S414). Then, the encryption/decryption unit 1404 transmits the encrypted MAC to the terminal device 1500 (step S415).

Then, the key distribution device 1400 judges whether the title key transfer processing has ended normally. If the processing has ended normally (YES in step S416), the key distribution device 1400 ends the title key transfer processing.

Through the above processing, the title key and other data necessary for playback of the content that are backed up in the key distribution device 1400 are securely transferred to the recording medium device 600b.

Figure 26:
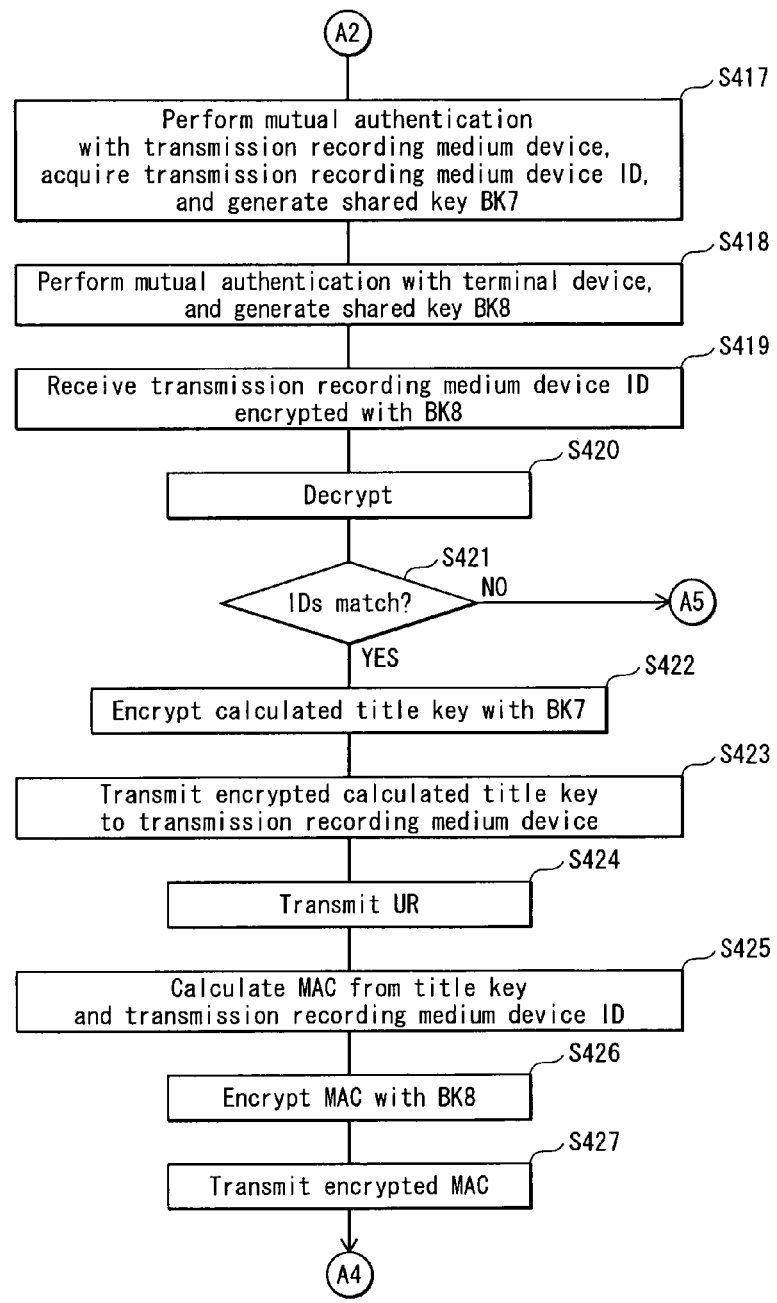
FIG. 26 is a flowchart showing operations of title key transfer processing (restoration processing).

If the title key transfer processing is not ended normally (NO in step S416), the key distribution device 1400 proceeds to step S417 of FIG. 26, and performs restoration processing for returning the title key and the other data necessary for playback of the content to the recording medium device 600a that is a transmitter.

The mutual authentication unit 1403 of the key distribution device 1400 performs mutual authentication with the recording medium device 600a that is a transmitter, verifies the authenticity of the recording medium device 600a, and shares a shared key BK7 with the recording medium device 600a. Furthermore, the mutual authentication unit 1403 acquires the transmission recording medium device ID from the recording medium device certificate of the recording medium device 600a (step S417).

Also, the mutual authentication unit 1403 performs mutual authentication with the terminal device 1500, verifies the authenticity of the terminal device 1500, and shares a shared key BK8 with the terminal device 1500 (step S418).

Next, the encryption/decryption unit 1404 receives the transmission recording medium device ID encrypted with the shared key BK8 from the terminal device 1500 (step S419). The encryption/decryption unit 1404 decrypts the transmission recording medium device ID with use of the shared key BK8 (step S420).

The mutual authentication unit 1403 judges whether the transmission recording medium device ID acquired in step S417 matches the transmission recording medium device ID decrypted in step S420.

If the IDs do not match (NO in step S421), the key distribution device 1400 ends the title key transfer processing.

If the IDs match, (YES in step S421), the encryption/decryption unit 1404 acquires the calculated title key from the calculated title key reception/transmission unit 1406, and encrypts the calculated title key with the shared key BK7 shared with the recording medium device 600a (step S422). Then, the encryption/decryption unit 1404 transmits the encrypted calculated title key to the recording medium device 600a (step S423).

Next, the UR transmission unit 1412 transmits the UR stored in the UR storage unit 1408 to the terminal device 1500, in order to write back the UR received in step S406 to the recording medium device 600a (step S424).

The MAC calculation unit 1411 calculates a MAC from the title key stored in the title key storage unit 1410 and the transmission recording medium device ID received in step S419 (step S425). The encryption/decryption unit 1404 encrypts the MAC calculated in step S425 with use of the shared key BK8 shared with the terminal device 1500 (step S426). Then, the encryption/decryption unit 1404 transmits the encrypted MAC to the terminal device 1500 (step S427).

Through the above processing, the title key and the other data necessary for playback of the content that are backed up in the key distribution device 1400 are securely returned to the recording medium device 600a.

<3-4. Structure of Terminal Device 1500>

Similarly to the terminal device 500, the terminal device 1500 is a personal computer including: a processor; a ROM; a RAM; a hard disk; a keyboard and a mouse that are input devices; a monitor that is a display device; one or more card slots for inserting the recording medium devices 600a and 600b therein; and a network connection unit. A computer program is recorded on the ROM, the RAM, or the hard disk. Some functions of the terminal device 1500 are realized by the processor executing the computer program.

The terminal device 1500 performs content move processing for moving the content and the title key from the recording medium device 600a to the recording medium device 600b.

Figure 27:
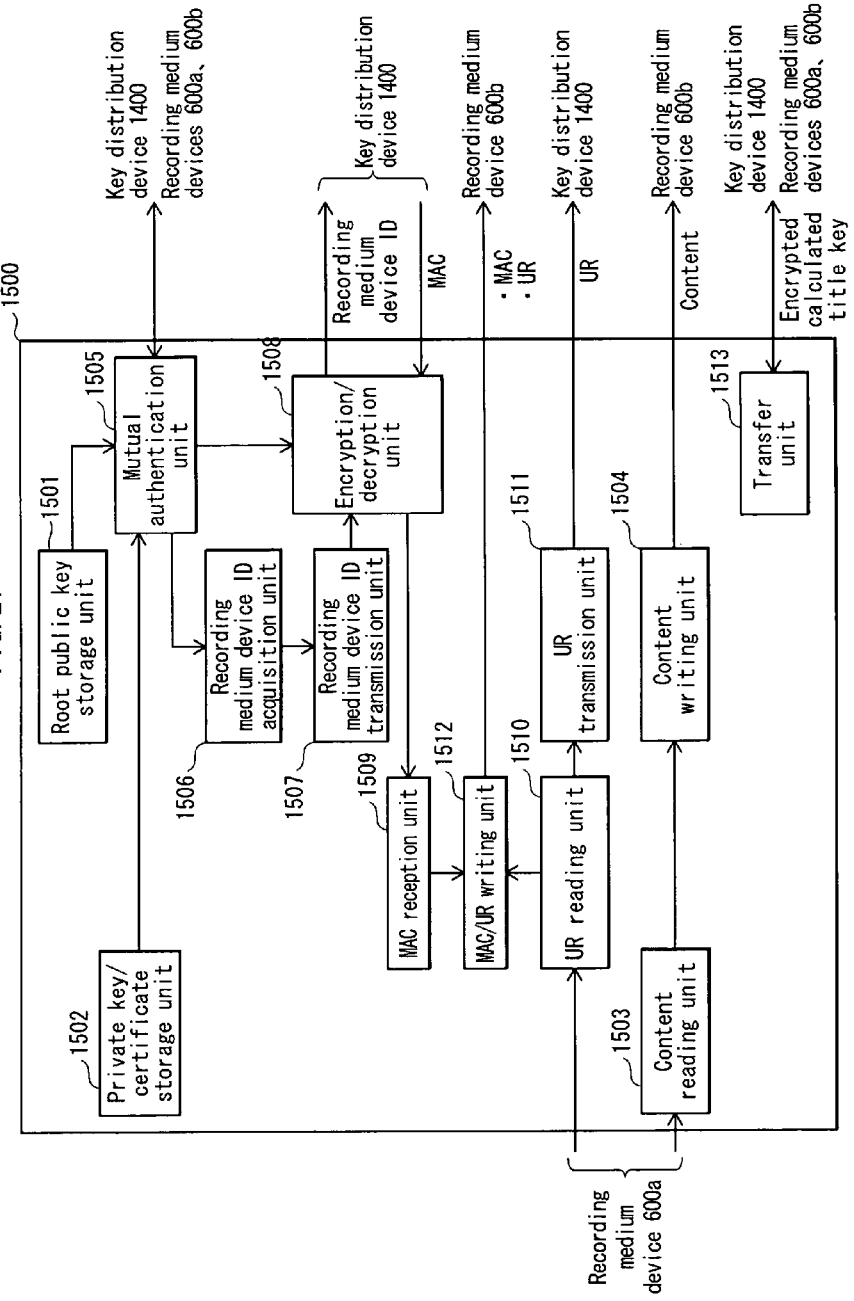
FIG. 27 is a block diagram showing a terminal device 1500.
Figure 28:
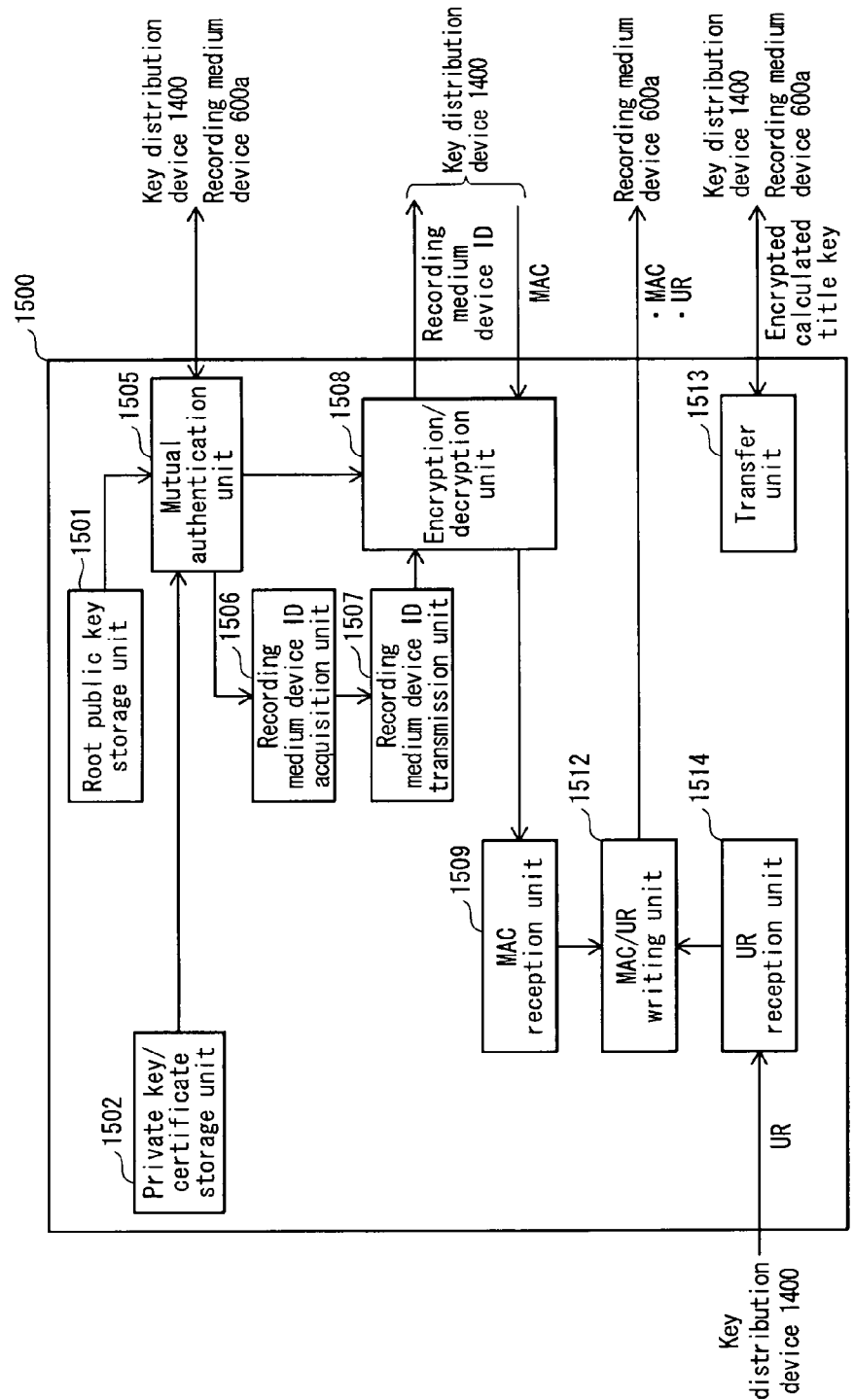
FIG. 28 is a block diagram showing the terminal device 1500.

FIGS. 27 and 28 are block diagrams each showing a functional structure of the terminal device 1500.

Specifically, FIG. 27 shows a functional structure of the terminal device 1500 during the content move processing. FIG. 28 shows a functional structure of the terminal device 1500 during the restoration processing for writing back, to the recording medium device 600a, the title key backed up in the key distribution device 1400 during the content move processing.

As shown in FIGS. 27 and 28, the terminal device 1500 includes a root public key storage unit 1501, a private key/ certificate storage unit 1502, a content reading unit 1503, a content writing unit 1504, a mutual authentication unit 1505, a recording medium device ID acquisition unit 1506, a recording medium device ID transmission unit 1507, an encryption/decryption unit 1508, a MAC reception unit 1509, a UR reading unit 1510, a UR transmission unit 1511, a MAC/UR writing unit 1512, a transfer unit 1513, and a UR reception unit 1514.

The root public key storage unit 1501 stores the root public key generated by the key issuing device 100.

The private key/certificate storage unit 1502 stores the terminal device private key and the terminal device certificate generated by the key issuing device 100.

Note that the root public key, the terminal device private key, and the terminal device certificate are embedded in the terminal device 1500 by a device that manufactures the terminal device 1500, during manufacturing of the terminal device 1500.

The content reading unit 1503 reads the content from the recording medium device 600*a*.

The content writing unit 1504 writes the content read by the content reading unit 1503 from the recording medium device 600*a* into the recording medium device 600*b*.

The mutual authentication unit 1505 performs mutual authentication with the key distribution device 1400, verifies the authenticity of the key distribution device 1400, and shares a shared key with the key distribution device 1400. Also, the mutual authentication unit 1505 performs mutual authentication with the recording medium device 600*a*, verifies the authenticity of the recording medium device 600*a*, and shares a shared key with the recording medium device 600*a*. Furthermore, the mutual authentication unit 1505 performs mutual authentication with the recording medium device 600*b*, verifies the authenticity of the recording medium device 600*b*, and shares a shared key with the recording medium device 600*b*.

The recording medium device ID acquisition unit 1506 acquires the recording medium device ID of the recording medium device 600*a* from the recording medium device certificate, which is received during the mutual authentication processing performed by the mutual authentication unit 1505 with the recording medium device 600*a*. Also, the recording medium device ID acquisition unit 1506 acquires the recording medium device ID of the recording medium device 600*b* from the recording medium device certificate, which is received during the mutual authentication processing performed by the mutual authentication unit 1505 with the recording medium device 600*b*.

The recording medium device ID transmission unit 1507 acquires, from the recording medium device ID acquisition unit 1506, the recording medium device ID of the recording medium device 600*a* and the recording medium device ID of the recording medium device 600*b*. Next, the recording medium device ID transmission unit 1507 transmits, to the key distribution device 1400 via the encryption/decryption unit 1508, the recording medium device ID of the recording medium device 600*a* as the "transmission recording medium device ID" and the recording medium device ID of the recording medium device 600*b* as the "reception recording medium device ID".

The encryption/decryption unit 1508 encrypts and decrypts data exchanged with the key distribution device 1400, with use of the shared key shared with the key distribution device 1400. Similarly, the encryption/decryption unit 1508 encrypts and decrypts data exchanged with the recording medium device 600*a*, with use of the shared key shared with the recording medium device 600*a*. Also, the encryption/decryption unit 1508 encrypts and decrypts data exchanged with the recording medium device 600*b*, with use of the shared key shared with the recording medium device 600*b*.

The MAC reception unit 1509 receives a MAC from the key distribution device 1400 via the encryption/decryption unit 1508. When the terminal device 1500 performs move processing, the MAC reception unit 1509 receives a MAC generated based on the reception recording medium device ID. When the terminal device 1500 performs restoration processing, the MAC reception unit 1509 receives a MAC generated based on the transmission recording medium device ID. The MAC reception unit 1509 transmits the received MAC to the MAC/UR writing unit 1512.

The UR reading unit 1510 reads a UR from the recording medium device 600*a*. The UR reading unit 1510 transmits the read UR to the UR transmission unit 1511 and the MAC/UR writing unit 1512.

The UR reception unit 1514 receives a UR from the key distribution device 1400. The UR reception unit 1514 transmits the received UR to the MAC/UR writing unit 1512.

The UR transmission unit 1511 transmits the UR received from the UR reading unit 1510 to the key distribution device 1400.

When the terminal device 1500 performs move processing, the MAC/UR writing unit 1512 writes, into the recording medium device 600*b*, (i) the MAC generated based on the reception recording medium device ID received by the MAC reception unit 1509 and (ii) the UR read by the UR reading unit 1510 from the recording medium device 600*a*. When the terminal device 1500 performs restoration processing, the MAC/UR writing unit 1512 writes, into the recording medium device 600*a*, (i) the MAC generated based on the transmission recording medium device ID received by the MAC reception unit 1509 and (ii) the UR received by the UR reception unit 1514 from the key distribution device 1400.

When the terminal device 1500 performs move processing, the transfer unit 1513 first transfers data exchanged on the session between the key distribution device 1400 and the recording medium device 600*a*. Specifically, the transfer unit 1513 receives, from the recording medium device 600*a*, an encrypted calculated title key generated by encrypting a calculated title key with use of the shared key shared between the key distribution device 1400 and the recording medium device 600*a*. Then, the transfer unit 1513 transmits the encrypted calculated title key thus received to the key distribution device 1400. Next, the transfer unit 1513 transfers data exchanged on the session between the key distribution device 1400 and the recording medium device 600*b*. Specifically, the transfer unit 1513 receives, from the key distribution device 1400, an encrypted calculated title key generated by encrypting a calculated title key with use of the shared key shared between the key distribution device 1400 and the recording medium device 600*b* through mutual authentication. Then, the transfer unit 1513 transmits the encrypted calculated title key thus received to the recording medium device 600*b*.

When the terminal device 1500 performs restoration processing, the transfer unit 1513 transfers data exchanged on the session between the key distribution device 1400 and the recording medium device 600*a*. Specifically, the transfer unit 1513 receives, from the key distribution device 1400, an encrypted calculated title key generated by encrypting a calculated title key with use of the shared key shared between the key distribution device 1400 and the recording medium device 600*a* through mutual authentication. Then, the transfer unit 1513 transmits the encrypted calculated title key thus received to the recording medium device 600*a*.

As described above, similarly to the transfer unit 513 in Embodiment 1, after the session is established between the key distribution device 1400 and the recording medium device (600a or 600b) through mutual authentication, the transfer unit 1513 simply transfers communication data transmitted via the session without verifying or modifying the data, except for control data indicating information such as the start and end of communication.

<3-5 Operations of Content Move Processing>

Figure 29:
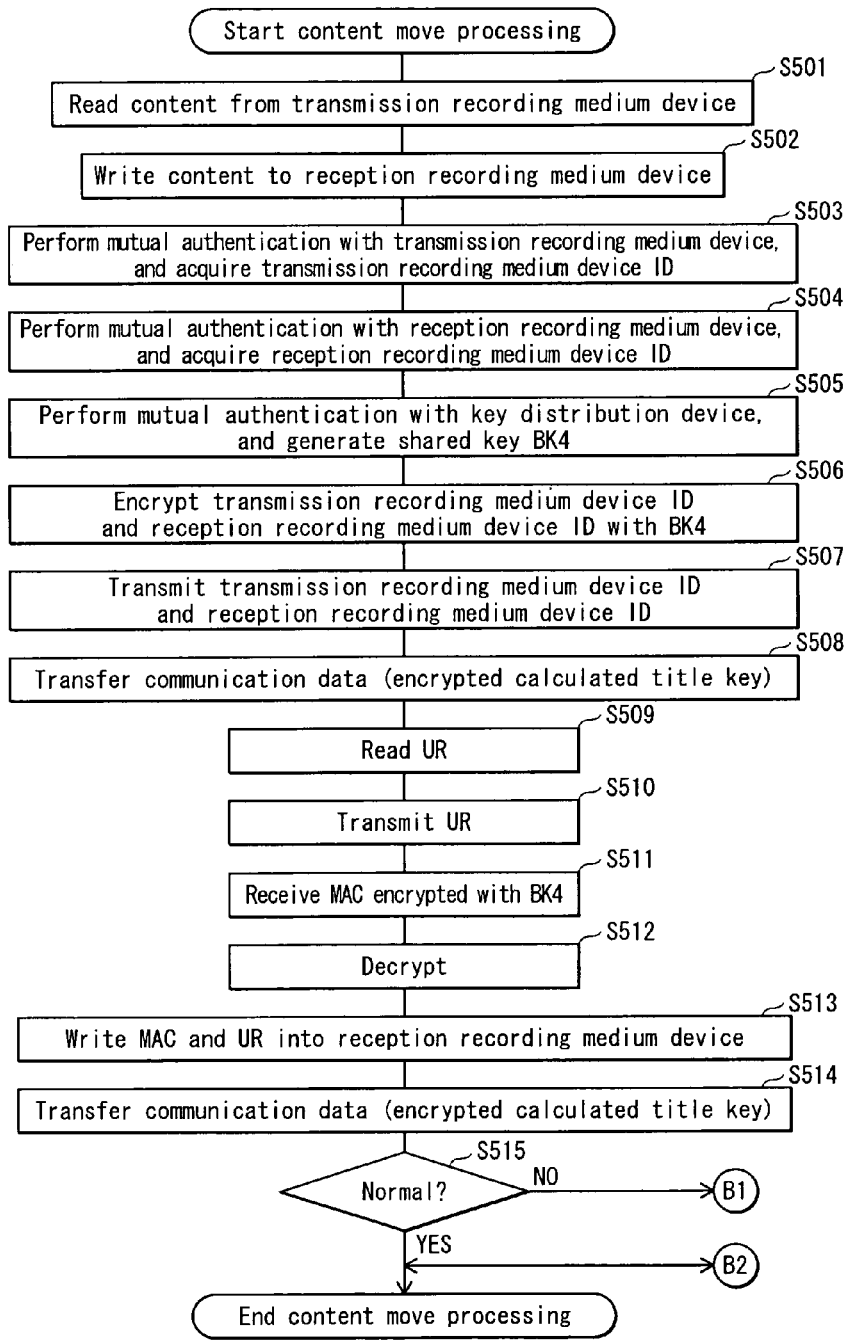
FIG. 29 is a flowchart showing operations of content move processing.
Figure 30:
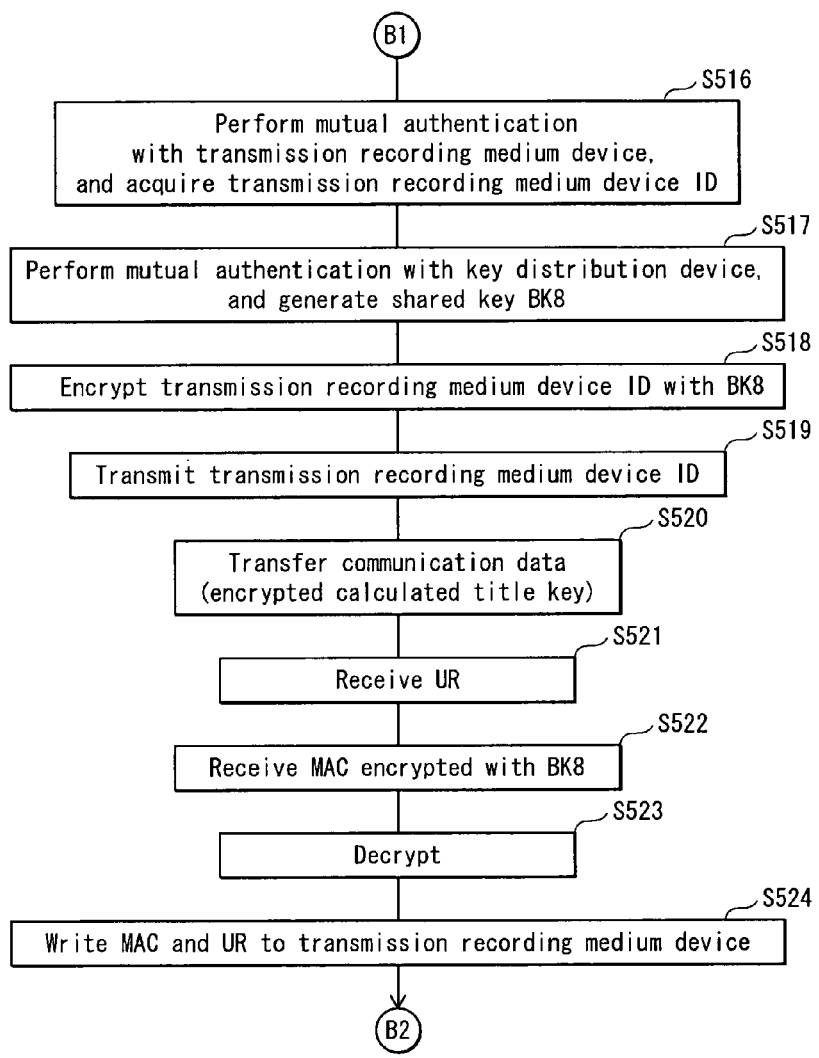
FIG. 30 is a flowchart showing operations of content move processing (restoration processing).

FIGS. 29 and 30 are flowcharts each showing operations of content move processing by the terminal device 1500.

The terminal device 1500 stores in advance the terminal device private key, the terminal device certificate, and the root public key.

The content reading unit 1503 reads content from the recording medium device 600a (step S501). The content writing unit 1504 writes the content read in step S501 into the recording medium device 600b (step S502).

The mutual authentication unit 1505 performs mutual authentication with the recording medium device 600a, and verifies the authenticity of the recording medium device 600a. The recording medium device ID acquisition unit 1506 acquires the transmission recording medium device ID from the recording medium device certificate of the recording medium device 600a received during the mutual authentication (step S503).

The mutual authentication unit 1505 performs mutual authentication with the recording medium device 600b, and verifies the authenticity of the recording medium device 600b. The recording medium device ID acquisition unit 1506 acquires the reception recording medium device ID from the recording medium device certificate of the recording medium device 600b received during the mutual authentication (step S504).

Subsequently, the mutual authentication unit 1505 performs mutual authentication with the key distribution device 1400, verifies the authenticity of the key distribution device 1400, and shares the shared key BK4 with the key distribution device 1400 (step S505).

The encryption/decryption unit 1508 encrypts the transmission recording medium device ID and the reception recording medium device ID acquired by the recording medium device ID acquisition unit 1506, with use of the shared key BK4 (step S506). Then, encryption/decryption unit 1508 transmits the transmission recording medium device ID and the reception recording medium device ID thus encrypted to the key distribution device 1400 (step S507).

Next, the transfer unit 1513 transfers communication data exchanged on the session between the key distribution device 1400 and the recording medium device 600a (step S508). The communication data transferred as described above is an encrypted calculated title key which is a calculated title key encrypted with a shared key unknown to the terminal device 1500.

The UR reading unit 1510 reads a UR from the recording medium device 600a (step S509). Then, the UR transmission unit 1511 transmits the UR read in step S509 to the key distribution device 1400 (step S510). In this way, the terminal device 1500 backs up the copy of the UR in the key distribution device 1400. Furthermore, the UR reading unit 1510 transmits the UR read in step S509 to the MAC/UR writing unit 1512.

Next, the encryption/decryption unit 1508 receives a MAC encrypted with the shared key BK4 from the key distribution device 1400 (step S511). The MAC received in step S511 is a MAC generated based on the reception recording medium device ID. The encryption/decryption unit 1508 decrypts the encrypted MAC with the shared key BK4 (step S512), and transmits the decrypted MAC to the MAC reception unit 1509.

The MAC reception unit 1509 receives the MAC from the encryption/decryption unit 1508 and transmits the MAC to the MAC/UR writing unit 1512.

The MAC/UR writing unit 1512 writes, into the recording medium device 600b, the MAC received by the MAC reception unit 1509 via the encryption/decryption unit 1508 and the MAC read by the UR reading unit 1510 from the recording medium device 600a (step S513).

Next, the transfer unit 1513 transfers communication data exchanged on the session between the key distribution device 1400 and the recording medium device 600b (step S514). The communication data transferred as described above is an encrypted calculated title key which is a calculated title key encrypted with a shared key unknown to the terminal device 1500.

Then, the terminal device 1500 judges whether the content move processing has ended normally. If the processing has ended normally (YES in step S515), the terminal device 1500 ends the content move processing.

Through the above processing, the content, the title key and the other data necessary for playback of the content are securely transferred from the recording medium device 600a to the recording medium device 600b.

If the content move processing is not ended normally for some reason, such as a breakdown of the recording medium device 600b that is a receiver (NO in step S515), the terminal device 1500 proceeds to step S516 of FIG. 30 to perform restoration processing for writing back the title key and the other data necessary for playback of the content to the recording medium device 600a that is a transmitter.

First, the mutual authentication unit 1505 performs mutual authentication with the recording medium device 600a, and verifies the authenticity of the recording medium device 600a. The recording medium device ID acquisition unit 1506 acquires the transmission recording medium device ID from the recording medium device certificate of the recording medium device 600a received during the mutual authentication (step S516).

Subsequently, the mutual authentication unit 1505 performs mutual authentication with the key distribution device 1400, verifies the authenticity of the key distribution device 1400, and shares the shared key BK8 with the key distribution device 1400 (step S517).

The encryption/decryption unit 1508 encrypts the transmission recording medium device ID acquired by the recording medium device ID acquisition unit 1506 in step S516 with use of the shared key BK8 (step S518), and transmits the transmission recording medium device ID thus encrypted to the key distribution device 1400 (step S519).

Next, the transfer unit 1513 transfers communication data exchanged on the session between the key distribution device 1400 and the recording medium device 600a (step S520). The communication data transferred as described above is an encrypted calculated title key which is a calculated title key encrypted with a shared key unknown to the terminal device 1500.

The UR reception unit 1514 receives a UR from the key distribution device 1400 (step S521), and transmits the UR to the MAC/UR writing unit 1512.

Also, the encryption/decryption unit 1508 receives a MAC encrypted with the shared key BK8 from the key distribution device 1400 (step S522). The MAC received in step S522 is a MAC generated based on the transmission recording medium device ID.

The encryption/decryption unit 1508 decrypts the MAC received in step S522 with the shared key BK8 (step S523), and transmits the decrypted MAC to the MAC reception unit 1509.

The MAC reception unit 1509 transmits, to the MAC/UR writing unit 1512, the MAC received via the encryption/decryption unit 1508.

The MAC/UR writing unit 1512 writes the MAC and the UR into the recording medium device 600a (step S524).

4. Modifications

Although having been described based on the above embodiments, the present invention is not limited to the content distribution system exemplified above. For example, the content distribution system may be modified as follows.

(1) In the above embodiments, an SD memory card is used as a specific example of the recording medium device 600. However, the recording medium device 600 is not limited to being an SD memory card. The recording medium device 600 may be a device composed of a storage device, such as an HDD, and a control LSI. Also, the recording medium device 600 is not limited to a removable device such as an SD memory card. The recording medium device 600 may be a device composed of an internal memory, such as in a mobile telephone, eBook, or NetBook, and a control LSI.

(2) Also, in the above embodiments, a PC is used as a specific example of each of the terminal devices 500 and 1500. However, the terminal devices 500 and 1500 are not limited to PCs. For example, the terminal device 500 may be a mobile terminal, such as a smartphone or a tablet terminal. Also, the terminal device 500 may be a so-called KIOSK terminal located at a shop such as a convenience store. Also, the terminal device 500 may be a reception device for receiving digital television broadcasts. It suffices for the terminal devices 500 and 1500 to be connectable to at least a network such as the Internet or a television broadcasting network, and to have a function of acquiring content, a title key, etc. via the network and recording these pieces of data into the recording medium device 600.

(3) According to the above embodiments, the terminal device 500 judges whether playback of the content is permitted, with use of the MAC generated based on the identification information of the recording medium device 600. However, information used for the judgment of whether playback is permitted is not limited to the MAC. For example, it is possible to use a result of an XOR operation performed on the calculated title key and the identification information of the recording medium device. Also, it is possible to use a result of an XOR operation performed on the calculated title key and a hash value of the identification information of the recording medium device. Furthermore, it is possible to use the identification information of the recording medium device 600 provided with the signature of the key issuing device 100. Furthermore, it is possible to use the identification information of the recording medium device 600 provided with the signature of the key distribution device 400. In this case, the terminal device 500 can judge whether playback of the content is permitted, by performing an XOR operation or a signature verification.

(4) According to the above embodiments, the content creation device 200 registers the content and the content identification information with the content distribution device 300. However, the structure of the content creation device 200 is not limited to such.

For example, the content identification information generation unit 209 may divide the content into pieces to generate partial contents, and calculate a hash value for each of the partial contents. Then, the content identification information generation unit 209 may generate a hash table including the hash values of the respective partial contents. The content registration unit 214 may embed the hash table into the content, and register the content in which the hash table is embedded with the content distribution device 300.

Also, the content identification information generation unit 209 may request the key issuing device 100 to generate the content identification information. For example, the content identification information generation unit 209 may transmit the hash table to the key issuing device 100. Upon receiving the hash table, the key issuing device 100 may assign a unique value to the hash table, and append the unique value to the hash table. Subsequently, the key issuing device 100 may provide the entirety of this data with a signature, and thereby generate data with a countermeasure against tampering. Next, the key issuing device 100 may return the data to the content identification information generation unit 209. The content identification information generation unit 209 may use the unique value assigned by the key issuing device 100 as the content identification information.

In the case of requesting the key issuing device 100 to generate the content identification information as described above, signature generation processing by the signature unit 210 may be omitted.

(5) According to the above embodiments, the key distribution device 400 and the terminal device 500 acquire the recording medium device ID during the mutual authentication with the recording medium device 600. However, the recording medium device ID may be acquired differently.

For example, the authorized region 607 of the recording medium device 600 may store the recording medium device ID for uniquely identifying the recording medium device 600. In this case, each of the key distribution device 400 and the terminal device 500 may perform mutual authentication with the recording medium device 600, share a shared key with the recording medium device 600, and thereafter receive the recording medium device ID encrypted with the shared key. Each of the key distribution device 400 and the terminal device 500 may decrypt the encrypted recording medium device ID with the shared key, and acquire the recording medium device ID.

(6) The mutual authentication processing described in the above embodiments may additionally include the following process.

Each of the key distribution device 400, the terminal device 500, and the recording medium device 600 acquires in advance, from the key issuing device 100, a revocation list including the device IDs of devices whose private keys are exposed (i.e., revoked devices). Then, each of the devices 400, 500, and 600 receives the public key certificate of a partner device during the mutual authentication processing with the partner device, extracts the device ID from the public key certificate, and judges whether the extracted device ID is included in the revocation list. If the device ID extracted from the public key certificate is included in the revocation list, in other words, if the partner device has been revoked, the mutual authentication processing is ended.

(7) According to Embodiment 1 above, the terminal device 500 performs: content recording processing for recording content, a title key, etc., into the recording medium device 600; and content playback processing for reading the content, etc., from the recording medium device 600 and playing back the content. However, the terminal device 500 does not necessarily perform both the content recording processing and the content playback processing. The terminal device 500 may perform only the content recording processing. The content playback processing may be performed by a terminal device different from the terminal device 500.

(8) According to Embodiment 2 above, the terminal device 1500 performs restoration processing for writing back a title key, etc., to the recording medium device 600a, if content move processing with respect to the recording medium device 600b does not end normally. However, the terminal device 1500 may perform the restoration processing only when the following conditions are satisfied: the content move processing with respect to the recording medium device 600b does not end normally; and the terminal device 1500 has received a user instruction to perform the restoration processing.

(9) The content distribution system 1 described above may be modified as shown in FIG. 31.

Figure 31:
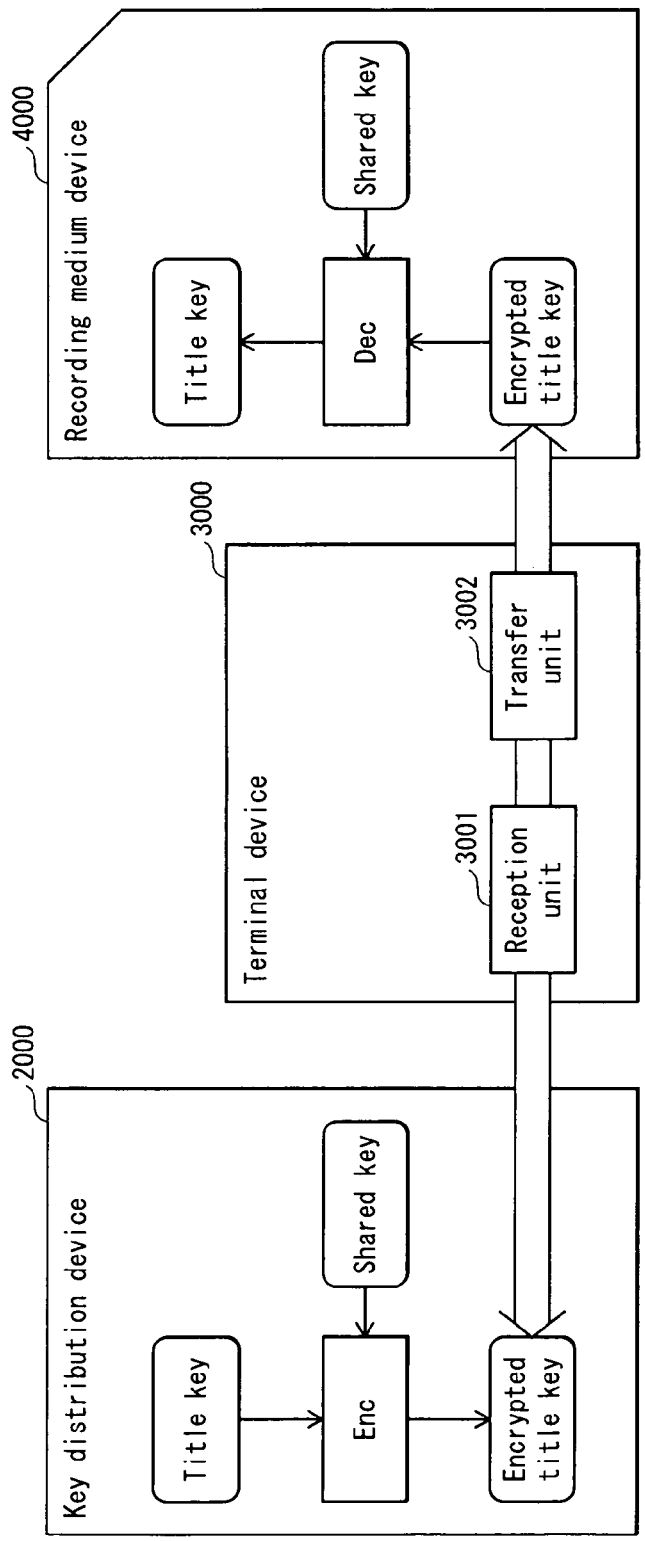
FIG. 31 is a diagram used to explain a modification.

A content distribution system shown in FIG. 31 includes a key distribution device 2000, a terminal device 3000, and a recording medium device 4000.

The terminal device 3000 is connected to the key distribution device 2000 via a network. The key distribution device 2000 distributes a title key necessary for use of content. The recording medium device 4000 is a device for storing the content and the title key, and is mounted in the terminal device 3000. The recording medium device 4000 and the key distribution device 2000 perform mutual authentication and share shared keys that are identical to each other. The terminal device 3000 comprises a reception unit 3001 and a transfer unit 3002. The reception unit 3001 receives an encrypted title key from the key distribution device 2000. The encrypted title key is the title key encrypted with the shared key of the key distribution device. The transfer unit 3002 transmits the encrypted title key to the recording medium device 4000. Upon completion of the mutual authentication between the recording medium device 4000 and the key distribution device 2000, the reception unit 3001 and the transfer unit 3002 refrain from any involvement with communication data except reception and transmission thereof. Here, the communication data is data exchanged between the recording medium device 4000 and the key distribution device 2000 with use of the shared keys.

The following describes an example of operations of the content distribution system shown in FIG. 31, with reference to FIG. 32. Upon detecting start of mutual authentication between the recording medium device 4000 and the key distribution device 2000 (step S601), the terminal device 3000 prohibits the reception unit 3001 and the transfer unit 3002 from being involved with the communication data except reception and transmission thereof, the communication data being exchanged between the recording medium device 4000 and the key distribution device 2000 with use of the shared keys (step S602).

The recording medium device 4000 and the key distribution device 2000 perform mutual authentication and share shared keys that are identical to each other (step S603).

The key distribution device 2000 encrypts the title key with the shared key of its own (step S604).

The terminal device 3000 receives the encrypted title key from the key distribution device 2000 (step S605), and transmits the encrypted title key to the recording medium device 4000 (step S606).

The recording medium device 4000 decrypts the encrypted title key with the shared key of its own to obtain the title key (step S607), and stores the title key (step S608).

Upon detecting end of a session between the recording medium device 4000 and the key distribution device 2000 (step S609), the terminal device 3000 cancels the prohibition of involvement with the communication data (step S610).

(10) According to the above embodiments, one example of the content is a movie consisting of video data and audio data. However, the content is of course not limited to a movie. For example, the content may be a still image such as JPEG data, a computer program, a computer game, music content without video data, or text data.

(11) It is possible to record a control program onto a recording medium and distributing the recording medium or to distribute the control program via various communication channels, the control program being composed of program codes written in a machine language or a high-level language for causing (i) a processor of the terminal device and (ii) various circuits connected to the processor to perform the content recording processing, the content playback processing, and the content move processing described in Embodiments 1 and 2. Examples of such a recording medium include an IC card, a hard disk, an optical disc, a flexible disk, a ROM, and a flash memory. The control program thus distributed becomes available for use by being stored in a processor-readable memory or the like. The functions described in the above embodiments are realized by a processor executing the control program. The processor may directly execute the control program. Alternatively, the processor may execute the control program after compiling it, or execute the control program with use of an interpreter.

(12) Each of the functional components described in Embodiments 1 and 2 (e.g., the content reception unit 503, the content identification information acquisition unit 504, the content writing unit 505, the mutual authentication unit 506, the recording medium device ID acquisition unit 507, the recording medium device ID/content identification information transmission unit 508, the encryption/decryption unit 509, the MAC reception unit 510, the UR reception unit 511, the MAC/UR writing unit 512, the transfer unit 513, the calculated title key reception unit 522, the UR reading unit 523, the title key recalculation unit 524, the MAC reading unit 525, the playback judgment unit 526, the content reading unit 527, the content decryption unit 528, the content playback unit 529, etc.) may be realized as a circuit that executes the function of the functional component itself or may be realized by a program executed by one or more processors. Also, the terminal device in Embodiment 1 and 2 may be realized as an integrated circuit package such as an IC, an LSI or the like. This package is produced in quantities and incorporated into various devices, whereby the devices realize the functions described in the above embodiments.

(13) The above embodiments and modifications may be appropriately combined.

SUMMARY

The following describes the structure of a terminal device as an embodiment of the present invention, and also describes modifications and effects thereof.

(a) Provided is a terminal device that is connected to a key distribution device via a network, and in which a recording medium device is mounted, the key distribution device being for distributing a title key necessary for use of content, the recording medium device being for storing therein the content and the title key, the recording medium device and the key distribution device performing mutual authentication and sharing shared keys that are identical to each other, the terminal device comprising: a reception unit configured to receive an encrypted title key from the key distribution device, the encrypted title key being the title key encrypted with the shared key of the key distribution device; and a transfer unit configured to transmit the encrypted title key to the recording medium device, wherein upon completion of the mutual authentication between the recording medium device and the key distribution device, the reception unit and the transfer unit refrain from any involvement with communication data except reception and transmission thereof, the communication data being exchanged between the recording medium device and the key distribution device with use of the shared keys.

According to this structure, upon completion of the mutual authentication between the recording medium device and the key distribution device, the terminal device refrains from any involvement with communication data except reception and transmission thereof, the communication data being exchanged between the recording medium device and the key distribution device with use of the shared keys. This prevents the title key from being acquired in an unauthorized manner.

(b) The terminal device may further comprise: a detection unit configured to detect start of the mutual authentication between the recording medium device and the key distribution device; and a prohibition unit configured to, upon start of the mutual authentication, prohibit the reception unit and the transfer unit from being involved with the communication data except reception and transmission thereof.

According to this structure, the terminal device detects start of the mutual authentication between the recording medium device and the key distribution device. This allows the terminal device to transition to a state of not being involved with the communication data except reception and transmission thereof, the communication data being exchanged between the recording medium device and the key distribution device with use of the shared keys.

In the above, the expression "refrains from any involvement with communication data" refers to refraining from verification, modification, etc. of communication data. If a field for control is appended to the communication data, the terminal device can perform processing with reference to the contents of the field for control.

(c) The recording medium device may store therein encrypted content and content identifier, the encrypted content being the content encrypted with the title key, and the content identifier identifying the content. The terminal device may further comprise a transmission unit configured to acquire the content identifier from the recording medium device and transmit the content identifier to the key distribution device. The encrypted title key received by the reception unit from the key distribution device may correspond to the content identifier.

With this structure, the title key necessary for decryption of the encrypted content can be stored in the recording medium device. The user can play back the content with use of the recording medium device in which the encrypted content and the title key are stored, and enjoy viewing the content.

(d) The transmission unit may be further configured to acquire, from the recording medium device, a medium identifier identifying the recording medium device, and transmit the medium identifier to the key distribution device. The reception unit may be further configured to receive, from the key distribution device, authentication information generated to associate the content with the recording medium device. The terminal device may further comprise a writing unit configured to write the authentication information into the recording medium device.

As described above, the authentication information is written into the recording medium device. In this way, at the time of playback of the content recorded in the recording medium device, verification using the authentication information may be performed so as to judge whether the content to be played back has been recorded in the recording medium device in an authorized manner.

Suppose that the encrypted content, the title key, and the authentication information recorded in the recording medium device are copied into a different recording medium device in an unauthorized manner. In such a case, the verification using the authentication information may be performed at the time of playback of the content. In doing so, since the authentication information is not associated with the different recording medium device, the terminal device can determine that the encrypted content and the title key recorded in the different recording medium device are not authorized. This makes it possible to stop playback of the content copied without authorization.

(e) The authentication information may be a message authentication code (MAC) calculated from the title key and the medium identifier.

The title key may be used as a message for authentication, and the medium identifier may be used as a key for generating the MAC. In this way, at the time of playback of the content, it is also possible to perform verification regarding the integrity of the title key.

Note that with the above structure, the authentication information such as the MAC is generated by the key distribution device. In other words, the terminal device cannot generate the authentication information. Accordingly, even if a malicious program pretending to be an authorized terminal device copies the encrypted content and the title key into the recording medium device without authorization, the malicious program cannot generate the authentication information. As such, the malicious program cannot generate an unauthorized copy playable in an authorized playback device which requires verification using the authentication information.

(f) The terminal device may establish a secure communication channel with the key distribution device. The reception unit may receive the authentication information via the secure communication channel. The transmission unit may transmit the content identifier and the medium identifier via the secure communication channel.

This prevents an unauthorized third party from stealing information exchanged between the key distribution device and the terminal device via the communication channel.

(g) The terminal device may further comprise a mutual authentication unit configured to perform mutual authentication with the key distribution device and generate a shared key identical with a shared key of the key distribution device. The authentication information received by the reception unit may have been encrypted with the shared key of the key distribution device. The transmission unit may encrypt the content identifier and the medium identifier with the shared key generated by the mutual authentication unit and transmit the content identifier and the medium identifier thus encrypted.

This prevents an unauthorized third party from stealing information exchanged between the key distribution device and the terminal device via the communication channel. In addition, a device not having a key identical with either of the shared keys cannot acquire the authentication information.

(h) The reception unit may be further configured to receive a usage rule of the content from the key distribution device. The writing unit may be further configured to write the usage rule into the recording medium device.

As described above, the usage rule is written into the recording medium device. In this way, at the time of playback, the content can be played back within the scope of the usage rule.

(i) The terminal device may transfer the title key from the recording medium device to a different recording medium device. The recording medium device and the key distribution device may perform mutual authentication and share first shared keys that are identical to each other. The different recording medium device and the key distribution device may perform mutual authentication and share second shared keys that are identical to each other. The terminal device may further comprise: a first reception unit configured to receive a first encrypted title key from the recording medium device, the first encrypted title key being the title key encrypted with the first shared key of the recording medium device; a first transfer unit configured to transmit the first encrypted title key to the key distribution device; a second reception unit configured to receive a second encrypted title key from the key distribution device, the second encrypted title key being the title key encrypted with the second shared key of the key distribution device; and a second transfer unit configured to transmit the second encrypted title key to the different recording medium device. Upon completion of the mutual authentication between the recording medium device and the key distribution device, the first reception unit and the first transfer unit may refrain from any involvement with communication data except reception and transmission thereof, the communication data being exchanged between the recording medium device and the key distribution device with use of the first shared keys. Upon completion of the mutual authentication between the different recording medium device and the key distribution device, the second reception unit and the second transfer unit may refrain from any involvement with communication data except reception and transmission thereof, the communication data being exchanged between the different recording medium device and the key distribution device with use of the second shared keys.

According to this structure, upon completion of the mutual authentication between the recording medium device and the key distribution device, the terminal device refrains from any involvement with communication data except reception and transmission thereof, the communication data being exchanged between the recording medium device and the key distribution device with use of the shared keys. This prevents the title key from being acquired in an unauthorized manner. Furthermore, upon completion of the mutual authentication between the different recording medium device and the key distribution device, the terminal device refrains from any involvement with communication data except reception and transmission thereof, the communication data being exchanged between the different recording medium device and the key distribution device with use of the second shared keys. This prevents the title key from being acquired in an unauthorized manner.

(j) The transmission unit may be further configured to acquire, from the different recording medium device, a medium identifier identifying the different recording medium device, and to transmit the medium identifier to the key distribution device. The reception unit may be further configured to receive, from the key distribution device, authentication information generated to associate the content with the different recording medium device. The writing unit may be further configured to write the authentication information into the different recording medium device.

As described above, the authentication information that associates the content with the different recording medium device is written into the recording medium device. In this way, even if encrypted content, the title key, and the authentication information recorded in the different recording medium device are copied into another recording medium device without authorization, it is possible to stop playback of the content copied without authorization.

(k) The authentication information may be a message authentication code (MAC) calculated from the title key and the medium identifier of the different recording medium device.

As described above, the title key may be used as a message for authentication, and the medium identifier of the different recording medium device may be used as a key for generating the MAC. In this way, at the time of playback of the content, it is also possible to perform verification regarding the integrity of the title key.

(l) Provided is a content recording system including: a terminal device connected to a key distribution device via a network; and a recording medium device, the recording medium device being mounted in the terminal device, the key distribution device being for distributing a title key necessary for use of content, the recording medium device being for storing therein the content and the title key, the recording medium device and the key distribution device performing mutual authentication and sharing shared keys that are identical to each other, the terminal device comprising: a first reception unit configured to receive an encrypted title key from the key distribution device, the encrypted title key being the title key encrypted with the shared key of the key distribution device; and a transfer unit configured to transmit the encrypted title key to the recording medium device, the recording medium device comprising: an authorized region that is a memory region that requires authentication processing when data is written thereto and data is read therefrom; a second reception unit configured to receive the encrypted title key from the transfer unit; and a decryption unit configured to decrypt the encrypted title key with use of the shared key of the recording medium device to obtain the title key, and write the title key into the authorized region, and upon completion of the mutual authentication between the recording medium device and the key distribution device, the first reception unit and the transfer unit refrain from any involvement with communication data except reception and transmission thereof, the communication data being exchanged between the recording medium device and the key distribution device with use of the shared keys.

According to this structure, upon completion of the mutual authentication between the recording medium device and the key distribution device, the terminal device refrains from any involvement with communication data except reception and transmission thereof, the communication data being exchanged between the recording medium device and the key distribution device with use of the shared keys. This prevents the title key from being acquired in an unauthorized manner.

(m) Provided is a title key recording method used in a terminal device that is connected to a key distribution device via a network, and in which a recording medium device is mounted, the key distribution device being for distributing a title key necessary for use of content, the recording medium device being for storing therein the content and the title key, the recording medium device and the key distribution device performing mutual authentication and sharing shared keys that are identical to each other, the title key recording method comprising: a reception step of receiving an encrypted title key from the key distribution device, the encrypted title key being the title key encrypted with the shared key of the key distribution device; and a transfer step of transmitting the encrypted title key to the recording medium device, wherein upon completion of the mutual authentication between the recording medium device and the key distribution device, the reception step and the transfer step refrain from any involvement with communication data except reception and transmission thereof, the communication data being exchanged between the recording medium device and the key distribution device with use of the shared keys.

According to this method, upon completion of the mutual authentication between the recording medium device and the key distribution device, the terminal device refrains from any involvement with communication data except reception and transmission thereof, the communication data being exchanged between the recording medium device and the key distribution device with use of the shared keys. This prevents the title key from being acquired in an unauthorized manner.

(n) Provided is a computer program used in a terminal device that is connected to a key distribution device via a network, and in which a recording medium device is mounted, the key distribution device being for distributing a title key necessary for use of content, the recording medium device being for storing therein the content and the title key, the recording medium device and the key distribution device performing mutual authentication and sharing shared keys that are identical to each other, the computer program causing the terminal device to perform: a reception step of receiving an encrypted title key from the key distribution device, the encrypted title key being the title key encrypted with the shared key of the key distribution device; and a transfer step of transmitting the encrypted title key to the recording medium device, wherein upon completion of the mutual authentication between the recording medium device and the key distribution device, the reception step and the transfer step refrain from any involvement with communication data except reception and transmission thereof, the communication data being exchanged between the recording medium device and the key distribution device with use of the shared keys.

According to this structure, upon completion of the mutual authentication between the recording medium device and the key distribution device, the terminal device refrains from any involvement with communication data except reception and transmission thereof, the communication data being exchanged between the recording medium device and the key distribution device with use of the shared keys. This prevents the title key from being acquired in an unauthorized manner.

INDUSTRIAL APPLICABILITY

The present invention is applicable to the industry of manufacturing and marketing terminal devices, content recording systems, and computer programs that record content and a title key which are distributed via a network onto a recording medium device such as a SD memory card. In the industry, the present invention is usable as a technology for preventing a malicious program from acquiring a title key.

REFERENCE SIGNS LIST 1, 2 content distribution system
100 key issuing device
200 content creation device
300 content distribution device
400, 1400 key distribution device
500, 1500 terminal device
600, 600a, 600b recording medium device

The invention claimed is:

1. A terminal device that is connected to a key distribution device via a network, and in which a recording medium device is mounted, the key distribution device being for distributing a title key necessary for use of content, the recording medium device storing therein the content and the title key, the terminal device being for transferring the title key from the recording medium device to a different recording medium device, the recording medium device and the key distribution device performing mutual authentication and sharing first shared keys that are identical to each other,
the terminal device comprising:
a first reception unit configured to receive a first encrypted title key from the recording medium device, the first encrypted title key being the title key encrypted with the first shared key of the recording medium device; and
a first transfer unit configured to transmit the first encrypted title key to the key distribution device, wherein
upon completion of the mutual authentication between the recording medium device and the key distribution device, the first reception unit and the first transfer unit refrain from any involvement with communication data except reception and transmission thereof, the communication data being exchanged between the recording medium device and the key distribution device with use of the first shared keys.

2. The terminal device of claim 1, further comprising:
a detection unit configured to detect start of the mutual authentication between the recording medium device and the key distribution device; and
a prohibition unit configured to, upon start of the mutual authentication, prohibit the first reception unit and the first transfer unit from being involved with the communication data except reception and transmission thereof.

3. The terminal device of claim 1, wherein
the different recording medium device and the key distribution device perform mutual authentication and share second shared keys that are identical to each other,
the terminal device further comprises:
a second reception unit configured to receive a second encrypted title key from the key distribution device, the second encrypted title key being the title key encrypted with the second shared key of the key distribution device; and
a second transfer unit configured to transmit the second encrypted title key to the different recording medium device, and
upon completion of the mutual authentication between the different recording medium device and the key distribution device, the second reception unit and the second transfer unit refrain from any involvement with communication data except reception and transmission thereof, the communication data being exchanged between the different recording medium device and the key distribution device with use of the second shared keys.

4. The terminal device of claim 3, further comprising:
a transmission unit configured to acquire, from the different recording medium device, a medium identifier identifying the different recording medium device, and to transmit the medium identifier to the key distribution device;
a reception unit configured to receive, from the key distribution device, authentication information generated to associate the content with the different recording medium device; and
a writing unit configured to write the authentication information into the different recording medium device.

5. The terminal device of claim 4, wherein
the authentication information is a message authentication code (MAC) calculated from the title key and the medium identifier of the different recording medium device.

6. The terminal device of claim 4, wherein
the terminal device establishes a secure communication channel with the key distribution device,
the reception unit receives the authentication information via the secure communication channel, and
the transmission unit transmits the medium identifier via the secure communication channel.

7. The terminal device of claim 6, further comprising
a mutual authentication unit configured to perform mutual authentication with the key distribution device and generate a shared key identical with a shared key of the key distribution device, wherein
the authentication information received by the reception unit has been encrypted with the shared key of the key distribution device, and
the transmission unit encrypts the medium identifier with the shared key generated by the mutual authentication unit and transmits the medium identifier thus encrypted.

8. The terminal device of claim 7, wherein
the reception unit is further configured to receive a usage rule of the content from the key distribution device, and
the writing unit is further configured to write the usage rule into the different recording medium device.

9. The terminal device of claim 1, wherein
the first reception unit is further configured to receive a usage rule of the content from the recording medium device, and
the terminal device further comprises:
a transmission unit configured to transmit the usage rule to the key distribution device.

10. A content recording system including: a terminal device connected to a key distribution device via a network; and a recording medium device, the recording medium device being mounted in the terminal device, the key distribution device being for distributing a title key necessary for use of content, the recording medium device storing therein the content and the title key, the terminal device being for transferring the title key from the recording medium device to a different recording medium device,
the recording medium device and the key distribution device performing mutual authentication and sharing shared keys that are identical to each other,
the recording medium device comprising:
an authorized region storing therein the title key, the authorized region being a memory region that requires authentication processing when data is written thereto and data is read therefrom;
an encryption unit configured to generate an encrypted title key by encrypting, with use of the shared key of the recording medium device, the title key read from the authorized region; and
a transmission unit configured to transmit the encrypted title key to the terminal device, and
the terminal device comprising:
a reception unit configured to receive the encrypted title key from the recording medium device; and
a transfer unit configured to transmit the encrypted title key to the key distribution device, wherein
upon completion of the mutual authentication between the recording medium device and the key distribution device, the reception unit and the transfer unit refrain from any involvement with communication data except reception and transmission thereof, the communication data being exchanged between the recording medium device and the key distribution device with use of the shared keys.

11. A title key recording method used in a terminal device that is connected to a key distribution device via a network, and in which a recording medium device is mounted, the key distribution device being for distributing a title key necessary for use of content, the recording medium device storing therein the content and the title key, the terminal device being for transferring the title key from the recording medium device to a different recording medium device,
the recording medium device and the key distribution device performing mutual authentication and sharing first shared keys that are identical to each other,
the title key recording method comprising:
a reception step of receiving an encrypted title key from the key distribution device, the encrypted title key being the title key encrypted with the shared key of the key distribution device; and
a transfer step of transmitting the encrypted title key to the recording medium device, wherein
upon completion of the mutual authentication between the recording medium device and the key distribution device, the reception step and the transfer step refrain from any involvement with communication data except reception and transmission thereof, the communication data being exchanged between the recording medium device and the key distribution device with use of the shared keys.

12. A non-transitory computer-readable recording medium having stored thereon a computer program used in a terminal device that is connected to a key distribution device via a network, and in which a recording medium device is mounted, the key distribution device being for distributing a title key necessary for use of content, the recording medium device storing therein the content and the title key, the terminal device being for transferring the title key from the recording medium device to a different recording medium device,
the recording medium device and the key distribution device performing mutual authentication and sharing first shared keys that are identical to each other,
the computer program causing the terminal device to perform:
a reception step of receiving an encrypted title key from the key distribution device, the encrypted title key being the title key encrypted with the shared key of the key distribution device; and
a transfer step of transmitting the encrypted title key to the recording medium device, wherein
upon completion of the mutual authentication between the recording medium device and the key distribution device, the reception step and the transfer step refrain from any involvement with communication data except reception and transmission thereof, the communication data being exchanged between the recording medium device and the key distribution device with use of the shared keys.

* * * * *